United States Patent
Endo et al.

(10) Patent No.: US 7,198,837 B1
(45) Date of Patent: *Apr. 3, 2007

(54) IMAGE FORMING PROCESS, INK SET, IMAGE BY INK-JET RECORDING, RECORDED ARTICLE, SURFACE-TREATED ARTICLE AND SURFACE TREATING PROCESS

(75) Inventors: Makiko Endo, Tokyo (JP); Yutaka Kurabayashi, Murayama (JP); Kentaro Yano, Yokohama (JP); Yuji Kondo, Machida (JP); Masao Kato, Utsunomiya (JP); Hiroshi Tomioka, Tokyo (JP); Mitsuhiro Ono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/708,569

(22) Filed: Nov. 9, 2000

(30) Foreign Application Priority Data

Nov. 12, 1999 (JP) ............................. 11-323241

(51) Int. Cl.
*B41M 5/00* (2006.01)
(52) U.S. Cl. .................. 428/195.1; 428/32.1; 347/105
(58) Field of Classification Search ............. 428/195, 428/32.36, 32.37
See application file for complete search history.

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 |
| 4,694,302 A | 9/1987 | Hackleman et al. | 346/1.1 |
| 4,723,129 A | 2/1988 | Endo et al. | 346/1.1 |
| 5,549,740 A | 8/1996 | Takahashi et al. | 106/20 R |
| 5,614,007 A | 3/1997 | Kurabayashi et al. | 106/22 R |
| 5,618,338 A | 4/1997 | Kurabayashi et al. | 106/26 R |
| 5,623,294 A | 4/1997 | Takizawa et al. | 347/98 |
| 5,624,484 A | 4/1997 | Takahashi et al. | 106/31.75 |
| 5,700,314 A | 12/1997 | Kurbayashi et al. | 106/31.27 |
| 5,792,249 A | 8/1998 | Shirota et al. | 106/31.27 |
| 5,833,743 A | 11/1998 | Elwakil | 106/31.27 |
| 5,835,116 A | 11/1998 | Sato et al. | 347/98 |
| 5,985,975 A | 11/1999 | Kurabayashi et al. | 524/462 |
| 6,027,210 A | 2/2000 | Kurabayashi et al. | 347/100 |
| 6,074,052 A | 6/2000 | Inui et al. | 347/101 |
| 6,238,045 B1 | 5/2001 | Ono et al. | 347/96 |
| 6,420,039 B1 * | 7/2002 | Field et al. | 428/451 |
| 6,460,989 B1 * | 10/2002 | Yano et al. | 347/101 |
| 6,517,199 B1 * | 2/2003 | Tomioka et al. | 347/101 |

(Continued)

FOREIGN PATENT DOCUMENTS

EP    0 675 178 A2    10/1995

(Continued)

*Primary Examiner*—Pamela R. Schwartz
(74) *Attorney, Agent, or Firm*—Fitzpatrick, Cella, Harper & Scinto

(57) ABSTRACT

An image forming method comprises a step of reacting an ink containing a coloring material with a liquid composition containing fine particles reactive to the coloring material on a recording medium, where the reaction between the coloring material and the fine particles occurs in a liquid, the coloring material is adsorbed on the surfaces of the fine particles while keeping the monomolecular state as in the ink, and the fine particles having the coloring material on the surface aggregate each other. This method can provide images of high optical density and high color saturation, with less occurrence of white stripes in the image.

7 Claims, 13 Drawing Sheets

U.S. PATENT DOCUMENTS

| | | | |
|---|---|---|---|
| 6,527,843 B1 * | 3/2003 | Zaima et al. | 106/31.33 |
| 6,536,890 B1 * | 3/2003 | Kato et al. | 347/100 |
| 6,659,601 B2 * | 12/2003 | Goto et al. | 347/100 |
| 6,719,420 B2 * | 4/2004 | Tomioka et al. | 347/100 |
| 6,729,718 B2 * | 5/2004 | Goto et al. | 347/100 |
| 6,746,114 B2 * | 6/2004 | Takahashi et al. | 347/100 |
| 6,821,328 B2 * | 11/2004 | Tomioka et al. | 106/31.33 |
| 6,830,709 B2 * | 12/2004 | Tomioka et al. | 252/506 |
| 6,863,391 B2 * | 3/2005 | Tomioka | 347/100 |

FOREIGN PATENT DOCUMENTS

| | | |
|---|---|---|
| EP | 0 776 950 A2 | 6/1997 |
| EP | 0 887 391 A1 | 12/1998 |
| EP | 0 900 831 A2 | 3/1999 |
| JP | 61-59911 B2 | 5/1979 |
| JP | 61-59912 B2 | 5/1979 |
| JP | 61-59914 B2 | 2/1980 |
| JP | 55-150396 | 11/1980 |
| JP | 63-22681 | 1/1988 |
| JP | 63-60783 | 3/1988 |
| JP | 63-299971 | 12/1988 |
| JP | 64-9279 | 1/1989 |
| JP | 64-63185 | 3/1989 |
| JP | 8-72393 | 3/1996 |
| JP | 8-224955 | 9/1996 |

* cited by examiner

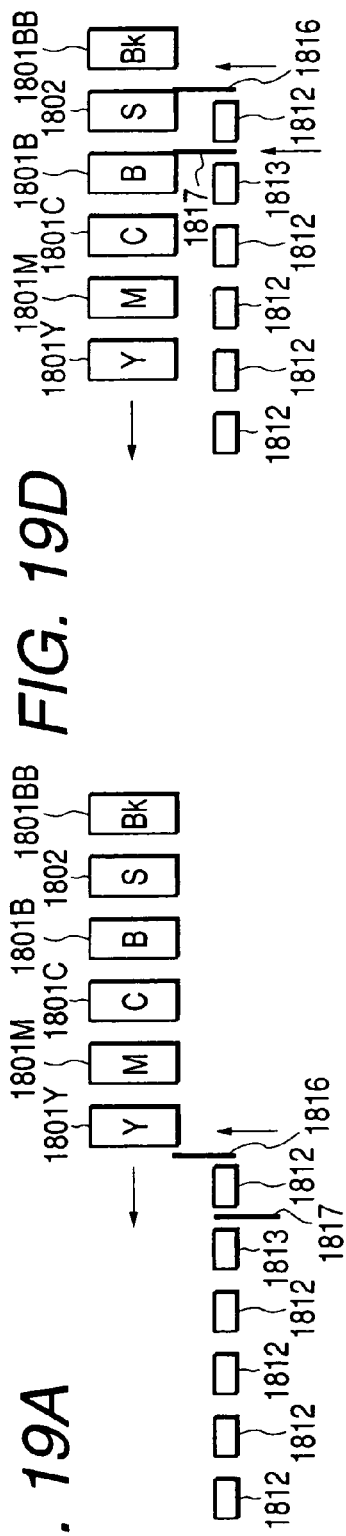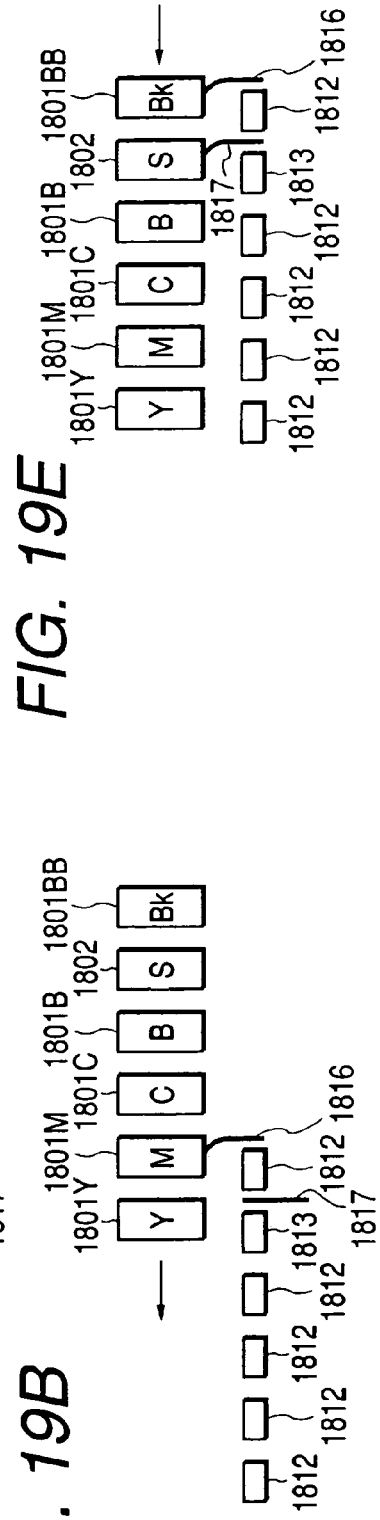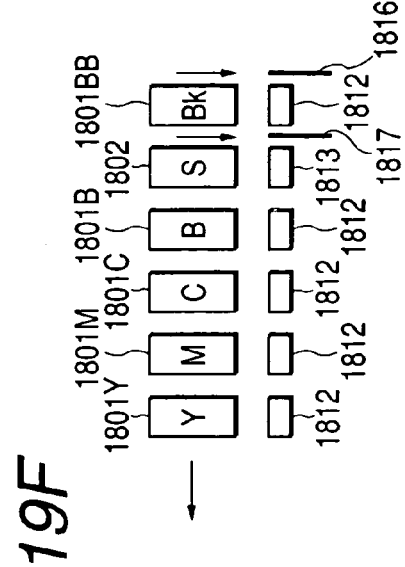

IMAGE FORMING PROCESS, INK SET, IMAGE BY INK-JET RECORDING, RECORDED ARTICLE, SURFACE-TREATED ARTICLE AND SURFACE TREATING PROCESS

BACKGROUND OF THE INVENTION

1. Field of the Invention

The present invention relates to an image forming process, an ink set, an image formed by the ink-jet method, a recorded article, a surface-treated article and a surface treating process.

2. Related Background Art

The ink-jet recording method conducts recording by ejecting ink to apply the ink onto a recording medium such as paper. It is easy to realize a head having high-density multi-orifice with ease, and formation of images of high-resolution and high-quality at high speed by using an ink jet recording method where an ink droplet is ejected by the actin of a bubble formed in the ink by applying thermal energy to the ink by using an electrothermal converter as an ejection-energy supply means as disclosed in, for example, Japanese Patent Publication Nos. 61-59911, 61-59912 and 61-59914.

In general, conventional inks for ink-jet recording contain water as a principal component, and in addition, a water-soluble solvent of a high boiling point such as glycol to prevent drying and clogging at orifices. When such an ink is used for recording on a recording medium, sometimes there arise problems such as insufficient fixation, and uneven image presumably due to the uneven distribution of a filler and/or a size on the surface of the recording medium such as paper.

Besides, image quality as high as the silver salt photograph has recently become required for ink-jet recording, leading to intense technical demands +for high image density, wide color reproduction range and enhanced color evenness on ink-jet recording.

Under such circumstances, various proposals have heretofore been made to stabilize the ink-jet recording process and to enhance the quality of articles recorded by the ink-jet recording process. One of the proposals on the recording medium is to coat the surface of a base paper of the recording medium with a filler and/or a size. For example, there has been disclosed a technique to form an ink receiving layer on the base paper by applying porous fine particles that adsorb a coloring material on the base paper as a filler. Recording media produced by using these techniques are now on market as the ink-jet coating paper etc.

One of the technical proposals on the recording liquid ejected onto the recording medium is application of an ink and a liquid reactive with the ink onto the recording medium in such a manner that the ink reacts with the liquid on the recording medium. Ink-jet printers using this technique are on the market.

More specifically, Japanese Patent Application Laid-Open No. 63-60783 discloses a method in which a liquid composition containing a basic polymer is applied to a recording medium, and an ink containing an anionic dye is then applied thereto, thereby conducting recording. Japanese Patent Application Laid-Open No. 63-22681 discloses a recording method in which a first liquid composition containing a reactive chemical species and a second liquid composition containing a compound reactive with the chemical species are mixed on the recording medium. Further, Japanese Patent Application Laid-Open No. 63-299971 discloses a method in which a liquid composition containing an organic compound having two or more cationic groups per molecule is applied to the recording medium, and recording is then conducted with an ink containing an anionic dye. Japanese Patent Application Laid-Open No. 64-9279 discloses a method in which an acidic liquid composition containing succinic acid or the like is applied to a recording medium, and recording is then conducted with an ink containing an anionic dye.

Further, Japanese Patent Application Laid-Open No. 64-63185 discloses a method in which a liquid composition that can insolubilize dyestuff is applied to the recording medium prior to application of an ink. Further, Japanese Patent Application Laid-Open No. 8-224955 discloses a method in which a liquid composition containing cationic substances different in molecular weight distribution range from each other is used together with an ink containing anionic compound. Japanese Patent Application Laid-Open No. 8-72393 discloses a method in which a liquid composition containing a cationic substance and finely ground cellulose is used together with an ink. In both publications, it is shown that the obtained image is excellent in image density, character quality, water fastness, color reproducibility and bleeding problem. Further, Japanese Patent Application Laid-Open No. 55-150396 discloses a method in which recording is conducted with a dye ink on a recording medium, and a water-proofing agent that forms a color lake with the dye is then applied to make the resulting recorded image water proof.

(1) Study of Images on Coated Paper:

It is well known that the above-described recording medium obtained by coating the surface of the base paper of the recording medium with a filler and/or a size (hereinafter referred to as coated paper) enables formation of high-quality images.

In general, in order to obtain an image of high saturation, it is known that the coloring material should be maintained in a monomolecular film state without aggregation on the surface of the recording medium, for which the porous fine particles on the coated paper serves. However, in order to obtain images of both high density and high saturation with a given ink containing a coloring material, it is indispensable to form an ink-receiving layer as thick as the paper substrate is covered with a large amount of the porous fine particles, thus leading to the loss of the texture of the base paper.

The present inventors thought that reason why such a thick ink-receiving layer is required that the coloring matter is not effectively adsorbed on the porous fine particles.

Following explanation is made assuming coated paper having one ink-receiving layer. FIG. 9 schematically illustrates a section of a coated paper in the vicinity of the surface thereof. In FIG. 9, reference numerals 901 and 903 indicate a base paper and an ink-receiving layer, respectively. The ink-receiving layer 903 comprises porous fine particles 905 and an adhesive (binder) 907 for immobilize particles. When an ink is applied to the ink-receiving layer 903, the ink penetrates into the voids between the porous fine particles 905 by capillarity to form ink-penetrated portions 909. As illustrated in FIG. 9, since the density of the porous fine particles in the ink-receiving layer varies locally, the mode of ink penetration by capillary phenomenon varies locally. Therefore, the coloring material cannot evenly contact with the surfaces of the porous fine particles in the course of ink penetration, so that the coloring material are not efficiently adsorbed by the porous fine particles.

Further, penetration of the ink is partially inhibited by the adhesive 907, and thus the ink-receiving layer 903 has portions into which the ink could not penetrate and which cannot contribute to coloring. For this reasons, the adsorption of coloring material in a monomolecular state by the fine particles is not efficient compared with the particle amount in the conventional coated paper. As a result, a great amount of the porous fine particles are required to provide a high-quality image, impairing the texture of the base paper.

Based on such a theory as described above, the present inventors have found out that by using a liquid dispersion of fine particles capable of adsorbing a coloring material together with an ink containing the coloring material for effective adsorption of the coloring material onto the particles in a liquid—liquid state, both the density and saturation of the resulting image are enhanced, which leads to the present invention.

(2) Study of Images Formed by Two-Liquid System:

As described above, an ink-jet recording process using an ink and a treating liquid reactive with the ink in combination (hereinafter referred to as "two-liquid ink-jet recording") is already recognized as an excellent technique which can provide extremely high-quality images irrespective of the kind of the recording medium.

However, further study of this technique by the present inventors has revealed that white stripes may appear in a recorded article depending on the recording conditions. The recent circumstances where image quality comparable to that of the silver salt photography is required for the ink-jet recorded articles has motivated the present inventors to solve this problem. The present inventors have studied further the cause of such white stripes and concluded that the white stripes occur due to the intense reaction between the ink and the treating liquid.

FIGS. 10A to 10C schematically illustrate a presumed phenomenon during two-liquid ink-jet recording on a recording medium to explain the mechanism of white stripes. Assumed is a case where an ink containing an anionic coloring material in an aqueous medium (hereinafter referred to as "anionic ink") and an aqueous liquid composition containing a cationic substance reactive with the anionic substance (coloring material). The liquid composition 1001 is first applied to the surface of a recording medium 1003 by an ink-jet system. The anionic ink 1005 is then applied to the site on the recording medium, to which the liquid composition 1001 has been applied, so that the ink and the liquid composition come into contact with each other in a liquid state on the recording medium, thereby starting the reaction of the anionic coloring material with the cationic substance. As a result, the liquid medium of the ink and the aqueous medium of the liquid composition penetrate deep into the recording medium, but the coloring material is retained on the surface of the recording medium as an aggregate 1007 formed by the reaction between the cationic substance and the coloring material. Reference numeral 1009 in FIG. 10C denotes the front of the penetrating liquid media.

As described above, in the two liquid ink-jet recording, both high image density and water resistance are achieved by preventing the coloring material from penetrating into the recording medium but retaining it on the surface of the recording medium as much as possible. In the conventional two-liquid ink-jet recording, the general recognition is that image quality is further enhanced by strengthening the reactivity of the ink with the liquid composition as much as possible to make all the coloring material in the ink react with the cationic substance for its retention on the surface of the recording medium.

However, the present inventors have thought that the control of the properties of the ink and the liquid composition based on the above technical idea might suppress the minute feathering around the colored parts or pixels forming the image which leads to occurrence of white stripes in the image, or might cause excessive aggregation of the coloring material which leads to reduction of color saturation of the image. Based on such a prediction and technical consideration, the inventors have carried out various experiments with the expectation that reduction of the reactivity between the two liquids in the two-liquid ink-jet recording can effectively prevent white stripes and can enhance the saturation of the image. As a result, minute feathering could be generated at the peripheries of colored parts or pixels without deteriorating image quality to enhance the saturation of the image.

SUMMARY OF THE INVENTION

In view of such findings as described above, the present inventors set up following objects.

(1) One object of the present invention is to provide an ink jet image of high density and saturation without impairing the texture of the recording medium, exploiting ink or coloring material more efficiently than before for enhancement of density and saturation of the image.

(2) Another object of the present invention is to provide an ink-jet recorded image of high saturation and higher quality with less white stripes.

It should be noted that the image forming process according to the present invention is not limited to an ink-jet field, and coloring materials is not limited to dyes and pigments but particles having different absorption characteristics or light emission characteristics or particles having desired functional characteristics may also be used. Further, it should be noted that the image forming process or surface treating process of the present invention can be applied to any substrate so long as it has a pretreated rough surface such as wall paper, concrete walls, as well as a recording medium such as paper. This makes a generic concept of the present invention.

(3) A further object of the present invention is to provide a process for forming an ink-jet recorded image, by which an ink-jet recorded image having high density and saturation can be formed without impairing the texture of a recording medium.

(4) A still further object of the present invention is to provide an ink set which can lessen the occurrence of white stripes to form an ink-jet recorded image high in saturation and extremely high in quality.

The above objects can be achieved by the present invention described below.

According to one aspect of the present invention, there is provided an image forming method comprising a step of reacting a droplet of an aqueous ink with a liquid composition on a recording medium, the ink containing a coloring material in a monomolecular state and the liquid composition containing fine particles reactive with the coloring material, wherein the step comprises:

a process where the coloring material reacts with the fine particles in a liquid comprised of the droplet and the liquid composition;

a process where the coloring material is adsorbed onto surfaces of the fine particles keeping the monomolecular state in the ink; and a process where the fine particles which have adsorbed the coloring material aggregate each other.

According to another aspect of the present invention, there is provided an image forming method comprising a step of conducting a liquid—liquid reaction between a droplet of an aqueous ink and a liquid composition on a recording medium, the ink containing a coloring material and the liquid composition containing fine particles reactive with the coloring material, wherein the step comprises:

a process where the coloring material is adsorbed by the fine particles on surfaces thereof while maintaining the monomolecular state in the ink; and a process where the fine particles which have adsorbed the coloring material aggregate each other.

According to a further aspect of the present invention, there is provided an image forming method comprising a step of conducting a liquid—liquid reaction between a droplet of an aqueous ink and a liquid composition on a recording medium, the ink containing a coloring material in a monomolecular state and the liquid composition containing fine particles reactive with the coloring material, wherein the step comprises:

a process where the fine particles near a constituent surface of the recording medium are physically or chemically adsorbed on the constituent surface of the recording medium;

a process where the coloring material is adsorbed by the fine particles on surfaces thereof while maintaining the monomolecular state in the ink; and a process where the fine particles which have adsorbed the coloring material aggregate each other.

According to a still further aspect of the present invention, there is provided an image forming method comprising a step of conducting a liquid—liquid reaction between a droplet of an aqueous ink and a liquid composition, the ink containing a coloring material in a monomolecular state and the liquid composition containing fine particles reactive to the coloring material, wherein the step comprises:

a process where the coloring material is adsorbed on surfaces of the fine particles at an interface between the droplet and the liquid composition while keeping the monomolecular state in the ink; and a process where the fine particles which have adsorbed the coloring material aggregate each other.

According to a still further aspect of the present invention, there is provided an image forming method comprising a step of conducting a liquid—liquid reaction between a droplet of an aqueous ink and a liquid composition, the ink containing a coloring material in a monomolecular state and the liquid composition containing fine particles reactive to the coloring material, wherein the step comprises:

a process where the coloring material diffuses into the liquid composition to be adsorbed on the surfaces of the fine particles while keeping the monomolecular state; and a process where the fine particles having adsorbed the coloring material on the surface thereof aggregate each other.

According to a still further aspect of the present invention, there is provided an image forming method comprising a step of conducting a liquid—liquid reaction between a droplet of an aqueous ink and a liquid composition, the ink containing a coloring material in a monomolecular state and the liquid composition containing fine particles reactive to the coloring material, wherein the step comprises:

a process where the coloring material is adsorbed on the surfaces of the fine particles while keeping the monomolecular state in the vicinity of an interface between the droplet and the liquid composition;

a process where the coloring material diffuses into the liquid composition to be adsorbed on the surfaces of the fine particles while keeping the coloring material in the monomolecular state; and a process where the fine particles having adsorbed the coloring material on the surface thereof aggregate each other.

According to a still further aspect of the present invention, there is provided an image forming process comprising a step of conducting a liquid—liquid reaction between a droplet of an aqueous ink and a liquid composition on a recording medium, the ink containing a coloring material in a monomolecular state and the liquid composition containing fine particles reactive to the coloring material, wherein the step comprises:

a process the fine particles in the vicinity of a constituent surface of the recording medium are physically or chemically adsorbed on the constituent surface of the recording medium;

a process where the coloring material is adsorbed on the surfaces of the fine particles while keeping the monomolecular state, in the vicinity of an interface between the droplet and the liquid composition;

a process where the coloring material diffuses into the liquid composition to be adsorbed on the surfaces of the fine particles while keeping the monomolecular state; and a process where the fine particles having adsorbed the coloring material on the surface thereof aggregates each other.

According to a still further aspect of the present invention, there is provided an image forming method comprising a step of conducting a liquid—liquid reaction between a droplet of an aqueous ink and a liquid composition, the ink containing a coloring material in a monomolecular state and the liquid composition containing fine particles reactive to the coloring material, wherein the step comprises:

a process where the fine particles in the vicinity of a constituent surface of the recording medium aggregate each other on the constituent surface of the recording medium;

a process where the coloring material is adsorbed on the surfaces of the aggregates of the fine particles while keeping the monomolecular state;

a process where the fine particles and the coloring material in the vicinity of an interface between the droplet and the liquid composition contact each other and the coloring material is adsorbed on the surfaces of the fine particles while keeping the monomolecular state;

a process where the coloring material diffuses into the liquid composition to be adsorbed on the surfaces of the fine particles while keeping the monomolecular state;

a process where a dispersion state of the fine particles becomes unstable due to the adsorption of the coloring material on the surfaces thereof, and the fine particles aggregate each other; and a process where the fine particles having adsorbed or bound the coloring material on the surfaces thereof are fixed to the surface of the recording medium.

According to a still further aspect of the present invention, there is provided an image forming method comprising a step of conducting a liquid—liquid reaction between a droplet of an aqueous ink and a liquid composition on a recording medium, the ink containing a coloring material in a monomolecular state and the liquid composition containing fine particles which are reactive to the coloring material and aggregate as a distance between particles becomes short, wherein the step comprises:

a process where the fine particles in the vicinity of a constituent surface of the recording medium aggregate each other on the constituent surface of the recording medium;

a process where the coloring material is adsorbed on or bonded to surfaces of the aggregates of the fine particles while keeping the monomolecular state;

a process where the fine particles in the vicinity of an interface between the droplet and the liquid composition come into contact with the coloring material to adsorb or bond the coloring material while keeping the monomolecular state of the coloring material;

a process where the coloring material diffuses into the liquid composition to be adsorbed on or bonded to surfaces of the fine particles while keeping the monomolecular state;

a process where the fine particles having adsorbed the coloring material on the surfaces thereof aggregate each other; and a process the fine particles and aggregates thereof having adsorbed or bonded the coloring material on the surfaces thereof are fixed to the surface of the recording medium.

According to a still further aspect of the present invention, there is provided an image forming method comprising a step of conducting a liquid—liquid reaction between a droplet of an aqueous ink and a liquid composition on a recording medium, the ink containing a coloring material in a monomolecular state, the liquid composition containing fine particles reactive to the coloring material, wherein the step comprises:

a process where the fine particles in the vicinity of a fiber surface of the recording medium are physically or chemically adsorbed on the fiber surface;

a process where the coloring material is adsorbed on surfaces of the fine particles in the vicinity of an interface between the droplet and the liquid composition while keeping the monomolecular state;

a process where the coloring material diffuses into the liquid composition to be adsorbed on surfaces of the fine particles while keeping the monomolecular state;

a process where the fine particles aggregate each other due to the adsorption of the coloring material on the surfaces of the fine particles; and a process where the fine particles having adsorbed the coloring material on the surfaces thereof are fixed to the surface of the recording medium.

According to a still further aspect of the present invention, there is provided an image forming method comprising a step of conducting a liquid—liquid reaction between a droplet of an aqueous ink and a liquid composition on a recording medium, the ink containing a coloring material in a monomolecular state, and the liquid composition containing fine particles reactive to the coloring material, wherein the step comprises:

a process where the fine particles in the vicinity of a fiber surface of the recording medium are physically or chemically adsorbed on the fiber surface;

a process where a pool of the liquid composition is formed on the recording medium;

a process where the coloring material is adsorbed on the surfaces of the fine particles in the vicinity of an interface between the droplet and the pool of the liquid composition while keeping the monomolecular state;

a process where the coloring material diffuses into the liquid composition to be adsorbed on surfaces of the fine particles while keeping the monomolecular state;

a process where the fine particles aggregate themselves due to the adsorption of the coloring material on the surfaces of the fine particles; and a process where the fine particles having adsorbed the coloring material on the surfaces thereof are fixed to the surface of the recording medium.

According to a still further aspect of the present invention, there is provided an image forming method comprising a step of conducting a liquid—liquid reaction between a droplet of an aqueous ink and liquid composition on a recording medium, the ink containing a coloring material and the liquid composition containing fine particles reactive to the coloring material, wherein the step comprises:

a process where the coloring material is adsorbed or bonded in a monomolecular state to the surfaces of the fine particles or aggregates of the fine particles at least on the surface of the recording medium or at the vicinity thereof; and a process where the fine particles or the fine particle aggregates, on the surfaces of which the coloring material has been adsorbed, are fixed to the surface of the recording medium or the vicinity thereof.

According to a still further aspect of the present invention, there is provided an image forming method comprising a step of conducting a liquid—liquid reaction between a droplet of an aqueous ink and a liquid composition, the ink containing a coloring material and the liquid composition containing fine particles reactive to the coloring material, wherein the step comprises:

a process where the fine particles in the vicinity of a constituent surface of the recording medium are physically or chemically adsorbed on the constituent surface;

a process where the coloring material is adsorbed or bonded in a monomolecular state to the surfaces of the fine particles or aggregates of the fine particles at least on the surface of the recording medium or at the vicinity thereof; and a process where the fine particles or the fine particle aggregates, on the surfaces of which the coloring material has been adsorbed, are fixed to the surface of the recording medium or the vicinity thereof.

According to a still further aspect of the present invention, there is provided an image forming method comprising a step of conducting a liquid—liquid reaction between a droplet of an aqueous ink and a liquid composition, the ink containing a coloring material and the liquid composition containing fine particles reactive to the coloring material, wherein the step comprises:

a process where the fine particles aggregate themselves in the vicinity of a constituent surface of the recording medium on the constituent surface;

a process where the coloring material is adsorbed or bonded to the surfaces of the fine particles or aggregates of the fine particles in a monomolecular state at least on the surface of the recording medium or at the vicinity thereof; and a process where the fine particles or the fine particle aggregates, on the surfaces of which the coloring material has been adsorbed, are fixed to the surface of the recording medium or the vicinity thereof.

According to a still further aspect of the present invention, there is provided an image forming method comprising a step of conducting a liquid—liquid reaction between a droplet of an aqueous ink and a liquid composition, the ink containing a coloring material in a monomolecular state and the liquid composition containing fine particles, which fine particles are reactive to the coloring material and aggregate by mixing with the ink, on a recording medium, wherein the step comprises:

a process where the fine particles in the vicinity of a constituent surface of the recording medium aggregate on the constituent surface;

a process where the coloring material is adsorbed on or bonded to the surfaces of aggregates of the fine particles while keeping the monomolecular state;

a process where the fine particles in the vicinity of an interface between the ink and the liquid composition come into contact with the coloring material to adsorb or bond the coloring material to the surfaces of the fine particles while keeping the monomolecular state of the coloring material;

a process where aggregation of the fine particles on the surfaces of which the coloring material has been adsorbed occurs; and a process where the fine particles and fine particle aggregates, on the surfaces of which the coloring material has been adsorbed or bonded, are fixed to the surface of the recording medium.

Use of the above-described various aspects of the present invention has advantages that it can provide ink-jet recorded images having extremely high quality such as excellent saturation and absence of white stripes, far better than those obtained by the two-liquid system of the prior art and more vivid than those formed on the conventional coated paper.

BRIEF DESCRIPTION OF THE DRAWINGS

FIGS. 12A, 12B, 12C, 12C-2 and 12D are schematic flow charts illustrating a forming process of a colored portion of an ink-jet recorded image according to the present invention.

FIGS. 19A, 19B, 19C, 19D, 19E and 19F typically illustrate a wiping operation of the ink-jet printer shown in FIG. 18, wherein FIG. 19A shows lifting of a blade for ink, FIG. 19B wiping of a printing head, FIG. 19C lowering of the blade for ink, FIG. 19D lifting of both blades after a liquid composition goes into proper position, FIG. 19E wiping of heads for the liquid composition and a second black ink, and FIG. 19F lowering of both blades.

DETAILED DESCRIPTION OF THE INVENTION

The technical idea of the present invention is to form an image by reacting two liquids in situ, one being a liquid containing a coloring material and the other a liquid containing fine particles reactive with the coloring material.

Although the reason why the various aspects of the present invention have advantages as described above is not clearly known, the following mechanism is considered on the basis of the technical findings obtained heretofore.

First, a recorded image according to the present invention is described with reference to FIG. 11.

Before that, terms must defined. The term "monomolecular state" as used herein means that a coloring material such as a dye or pigment is in a state dissolved or dispersed in an ink. If the coloring material aggregates a little, the state is called "monomolecular" so long as the saturation of the formed image is not lowered. Since the monomolecular state is preferable for dyes, such a state is called "monomolecular state" with coloring materials other than dyes, for convenience. The term "liquid—liquid reaction" as used herein includes not only reactions that reactants are liquid, but also reactions occurs in a solution or dispersion containing the reactant.

Figure 11:
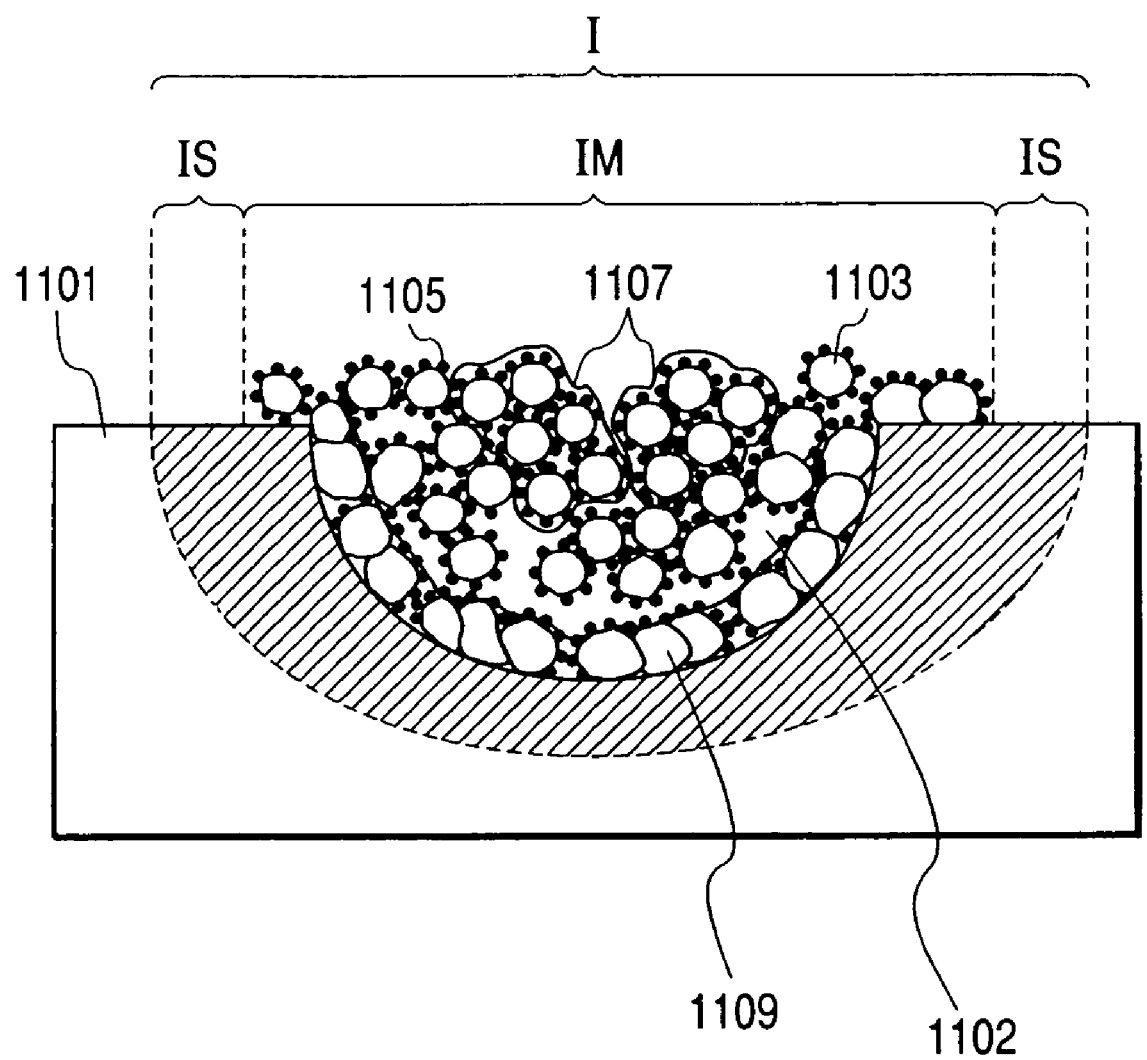
FIG. 11 is a typical cross-sectional view of a colored portion in an ink-jet recorded image according to the present invention.

FIG. 11 is a typical illustration of a colored portion I of a recorded image according to the present invention, which is comprised of a main image portion IM and a peripheral portion IS thereof. In FIG. 11, reference numeral 1101 indicates a recording medium, and 1102 voids among fibers of the recording medium. Reference numeral 1103 designates fine particles typically illustrated, on which a coloring material 1105 is chemically adsorbed. The main image portion IM is formed by the fine particles 1103 on the surfaces of which the coloring material 1105 has been uniformly adsorbed in a monomolecular state, and aggregates 1107 of the fine particles, in which the monomolecular state of the coloring material is kept. Reference numeral 1109 indicates aggregates of the fine particles present near the fibers of the recording medium within the main image portion IM. The main image portion IM is formed by the step of adsorption of the fine particles 1103 physically or chemically by the fibers of the recording medium, and the step of adsorption of the coloring material 1105 by the fine particles 1103 in a liquid—liquid state. Therefore, the coloring properties of the coloring material are scarcely impaired, and even on an easily penetrable recording medium such as plain paper, it can be formed images of high image density and saturation with a color reproduction range as wide as on coated paper.

Besides, delicate feathering of the ink is formed at the peripheral portion IS. As the coloring material remains in the vicinity of the surface of the recording medium 1101 and the delicate feathering of the ink occurs at the peripheral portion, it is possible to form of an image having without haze and color irregularity and excellent in color evenness even in an image region such as solid portions or shadow portions where a large amount of the ink is applied. According to the present invention, when the recording medium 1101 has a permeability to the ink and liquid composition, the penetration of the ink or the liquid composition into the recording medium is not completely prevented but allowed to some extent, as shown in FIG. 11.

Although the above described relates to a surface treatment with a liquid composition and coloring material in the ink-jet recording medium, it can be understood that in the generic concept of the present invention, the coloring material can be particles having the desired properties according to a certain object and the recording medium can be a base material having a certain roughness. It can also be understood that the scope of the invention may be modified according to the generic concept.

Thus, the generic concept of the present invention relates to a surface treating process which comprises applying a second liquid composition and then a first liquid composition onto a base material having a certain roughness (even if minute), where the first liquid composition contains particles having desired properties according to the object and the second liquid composition contains fine particles having an opposite polarity to the particles in the first composition to aggregate with them on the base material. The technical feature of the surface thus treated is based on the above object.

Accordingly, a technique of the generic concept of the present invention can uniformly fix particles in an applied liquid onto the surface of a substrate with a high efficiency, to impart the desired properties to the surface.

The present invention will hereinafter be described in more detail.

First, the forming process of a recorded image according to the present invention is described in more detail by reference to FIGS. 12A to 12D.

Figure 12A:
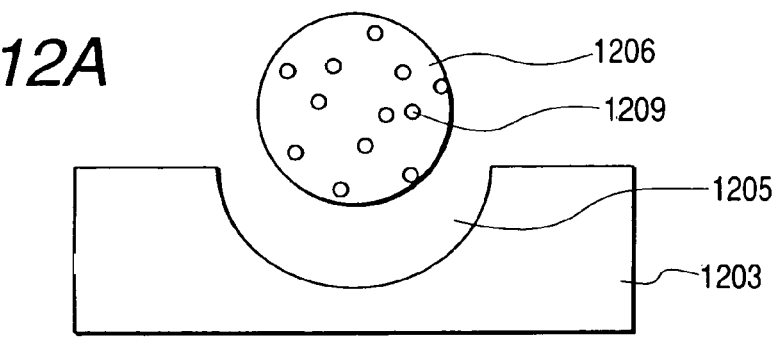
Figure 12B:
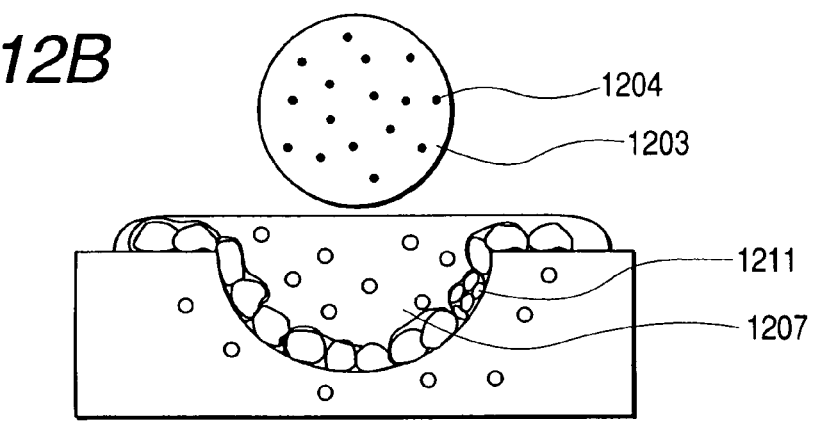
Figures 2, 12C:
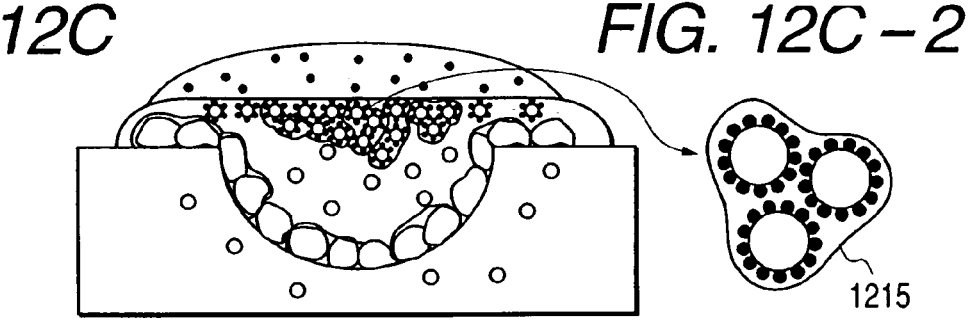
Figure 12D:
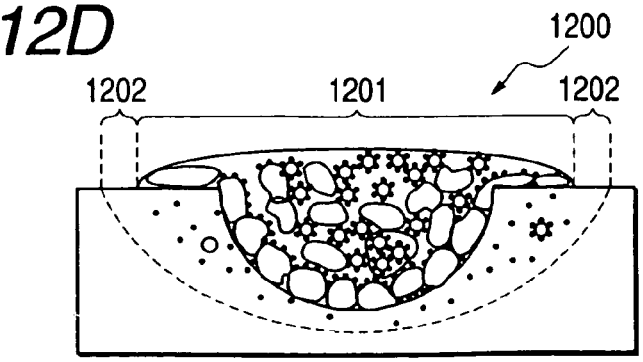

FIGS. 12A to 12D illustrates an ink-jet recording image forming process according to one aspect of the present invention. FIG. 12D is a schematic cross-sectional view of a colored portion 1200 of an ink-jet recorded image, where reference numeral 1201 indicates a portion mainly containing a reaction product of an ink and a liquid composition, for example, a reaction product between a coloring material and fine particles (hereinafter referred to as "reaction portion"), corresponding to the main image portion IM in FIG. 11. Reference numeral 1202 designates a portion formed by an ink portion not reacted with the liquid composition and oozed in the periphery of the reaction portion 1201 (hereinafter referred to as "ink ooze portion"), and corresponding to the peripheral portion is in FIG. 11. Such a colored portion 1200 is formed, for example, in the following manner. In FIG. 12A, reference numeral 1205 denotes a typical void between fibers of a recording medium 1203. A liquid composition 1206 reactive with the coloring material 1204 is first applied as a droplet to the recording medium 1203. As a result, a pool 1207 of the liquid composition is formed (FIG. 12B). In the pool 1207, fine particles 1209 in the vicinity of the fiber surfaces of the recording medium are physically or chemically adsorbed on the surfaces of the fibers of the recording medium, and the dispersed state of the fine particles becomes unstable to form aggregates 1211 of the fine particles themselves, while the fine particles 1209 apart from the fibers in the pool 1207 are in the original dispersed state.

Then an ink 1213 is applied as a droplet to the recording medium 1203 (FIG. 12B). As a result, the coloring material 1204 is chemically adsorbed by the fine particles 1209 at an interface between the ink 1213 and the pool 1207. Since this reaction is a reaction between liquids (liquid—liquid reaction), the coloring material 1204 is considered to be uniformly adsorbed in a monomolecular state on the surfaces of the fine particles 1209 (FIG. 12C). More specifically, it is considered that the coloring material would not aggregate by itself at the vicinity of the surfaces of the fine particles, or aggregation is very little, if any. As a result, a large number of fine particles adsorbing the coloring material 1204 in the monomolecular state are formed on the surface of the reaction portion 1201, and the coloring material remains in the monomolecular state on the surface area which affects the coloring most. Therefore, a recorded image high in image density and saturation can be formed.

It is considered that the fine particles which adsorbed the coloring material then aggregate by themselves as the dispersed state becomes unstable (FIG. 12C). Thus, the aggregates 1215 formed are holding the coloring material in the monomolecular state inside thereof and form a recorded image of high image density and saturation. Further, a part of unreacted coloring material 1204 diffuses in the pool 1207 to be adsorbed on the surfaces of unreacted fine particles 1209. As described above, the reaction further proceeds within the pool 1207, so that an image of still higher image density and saturation is formed. The aggregates 1211 of the fine particles formed on the surfaces of fibers of the recording medium are considered to inhibit the penetration of the liquid phase in the pool 1207 into the recording medium. As a result, there are more of coloring material and fine particles in the pool 1207 to enhance the contact probability of the coloring material 1204 with the fine particles 1209, and the reaction proceeds uniformly and sufficiently to form an image of more uniformity with high image density and saturation.

When the liquid composition 1206 is applied to the recording medium 1203 (FIG. 12A), or the ink 1213 is applied to the pool 1207 (FIG. 12B), changes in the dispersion medium may occur and make the dispersion state of the fine particles 1209 unstable so that some fine particles 1209 may aggregate before the coloring material 1204 is adsorbed thereon. The term "changes in dispersion medium" as used herein means changes generally observed when a liquid is mixed with other liquids or substances, changes in physical properties such as pH, solid concentration, solvent composition, and dissolved ion concentration in the liquid phase. It is considered that when the liquid composition contacts the recording medium or the ink, these changes take place rapidly and complexly to break the dispersion stability of the fine particles, and the aggregates are formed. It is considered that these aggregates serve to fill the voids and to keep more fine particles having adsorbed the coloring material near the surface of the recording medium. Among these aggregates formed in the pool 1207, there are those adsorbed on the recording medium and those suspended in the liquid phase (having mobility). Those having mobility can adsorb the coloring material in a monomolecular state on the surfaces thereof in the same manner as with the fine particles as above-described above, to form larger aggregates which contribute to the enhancement of coloring. The aggregates are considered to move together with the liquid phase upon the penetration of the liquid phase along the fibers so as to fill the voids to smooth the surface of the recording medium, thereby contributing to the formation of an image more uniform and high in image density. The reason why high coloring of the image is obtained, as shown later, by the present invention is considered that the coloring material is adsorbed in a monomolecular state on the fine particles or on the aggregates thereof to remain in the vicinity of the surface of the recording medium. Also fastness of the formed image is enhanced since the fine particles adsorbed the coloring material in the monomolecular state remain fixed on the surface of the recording medium.

Incidentally, although in the above explanation the liquid composition and the ink are applied to the recording medium in this order, the application order of them to the recording medium is not limited thereto, so far as the liquid—liquid mixing of them occurs. Therefore, application may be in an order of the ink and then the liquid composition.

As illustrated in FIG. 12B, at least a part of the fine particles in the liquid composition applied to the recording medium are considered to penetrate into the interior of the recording medium as the liquid medium penetrates into the recording medium. Meanwhile, as illustrated in FIG. 12D, not all of the coloring material in the ink is adsorbed or bonded to the fine particles on the recording material, but a part thereof penetrates into the interior of the recording medium as the liquid medium of the ink penetrates into the recording medium. It is also presumable that, in this penetration process, the coloring material are adsorbed by the fine particles already penetrated in the recording medium as shown in FIG. 12D. As described above, the fine particles, on which the coloring material has been adsorbed or bonded in a monomolecular state in the recording medium, are considered to contribute to the improvement of coloring ability. Further, it is considered that the fixing ability is also improved by such penetration of the liquid medium.

Next, we will explain the other reasons why the liquid—liquid reaction between the liquid composition and the aqueous ink enables more effective adsorption of the coloring material to the fine particles in the composition.

The inventors have found out that the specific gravity of the liquid composition is greater than that of the aqueous ink in most cases, which may be attributable to the relatively high density of the fine particles in the liquid composition. Following mechanism is inferred from these observations. When an droplet is shot into a pool previously formed by another droplet on a recording medium, the pool would be pushed away in general, and then both liquids are mixed with each other. This push-away and mix process differs according to the specific gravity difference between these two droplets. This is described with reference to FIGS. 13A to 13D.

Figure 13A:
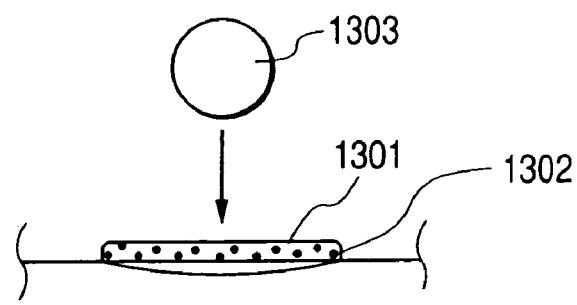
FIGS. 13A, 13B, 13C and 13D schematically illustrate a phenomenon when an ink and a liquid composition, which make up an ink set according to the present invention, are mixed with each other on a recording medium.
Figure 13B:
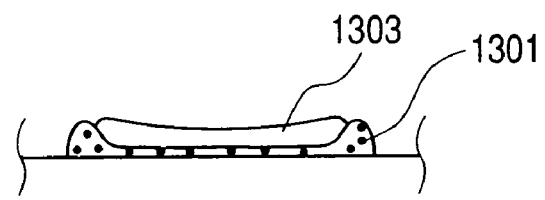

FIGS. 13A and 13B schematically illustrate a case where first applied is a droplet 1301 of a liquid composition containing particles 1302 of high specific gravity and then a droplet 1303 of an aqueous ink of lower specific gravity. In this case, the liquid composition 1301 is hard to be pushed away due to its high specific gravity (FIG. 13A), and would wrap the ink 1303 (FIG. 13B). Thus, the contact area between them will increase to make the reaction between both liquids more efficient.

Figure 13C:
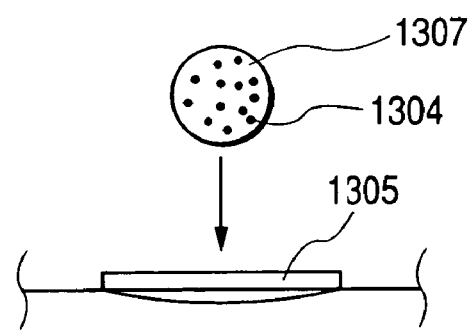
Figure 13D:
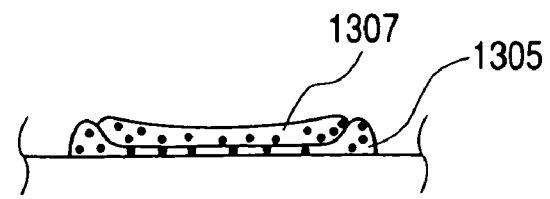

On the other hand, when a droplet 1305 of the aqueous ink of lower specific gravity is applied to a recording medium, and then a droplet of the liquid composition 1307 of higher specific gravity (containing particles of high specific gravity 1304) is shot into the ink pool as illustrated in FIGS. 13C and 13D, the ink 1305 is pushed away to a large extent but the fine particles of high specific gravity in the liquid composition 1307 would sink more quickly into the ink 1305 (FIG. 13D) to make the contact probability of the fine particles with the coloring material high. As a result, the reaction between both substances is more efficiently conducted.

As described above, efficient reaction can be expected when the specific gravities of the liquids are different from each other, although the mechanism thereof may be different according to the order of application. The above explanation was made on the case where the specific gravity of the liquid composition is higher than that of the aqueous ink. However, if it is reverse, it is apparent from the above description that the same effect is achieved. It will be understood that, in the present invention, the application order of the ink and the liquid composition to the recording medium does not make a substantial difference so far as the liquid—liquid mixture is achieved on the recording medium.

Figure 14A:
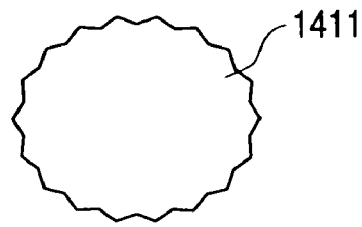
FIGS. 14A, 14B, 14C, 14D, 14E and 14F are schematic plan views illustrating a state of the vicinity of a colored portion when an ink and a liquid composition, which make up an ink set according to the present invention, are applied to a recording medium so as to come into contact with each other.
Figure 14D:
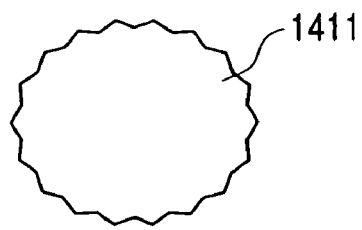
Figure 14B:
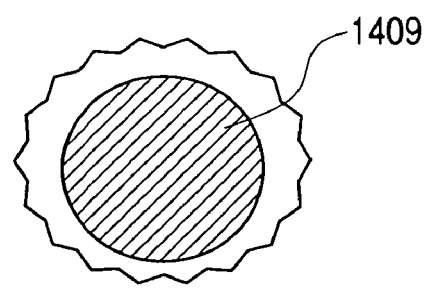
Figure 14E:
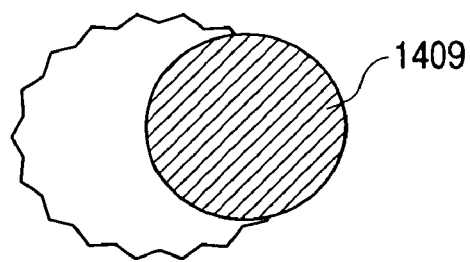
Figure 14C:
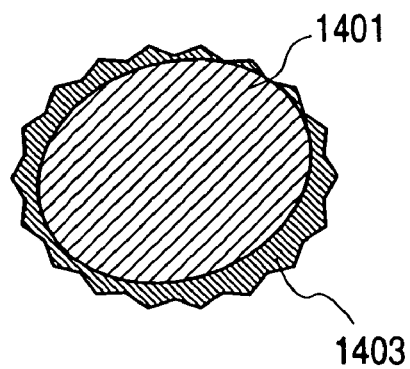

FIGS. 14A to 14C are a schematic flow chart illustrating a forming process of a colored portion of an ink-jet recorded image according to an aspect of the present invention. In FIGS. 14A to 14C, reference numeral 1401 indicates a reaction portion mainly containing a reaction product between an ink and a liquid composition, i.e., a reaction product of a coloring material and fine particles, and 1403 an ink-ooze portion formed by an ink which has substantially not participated in the reaction with the liquid composition and oozed into the periphery of the reaction portion 1401. Such a colored portion is formed, for example, in the following manner.

A liquid composition according to the present invention is first applied as a droplet to a recording medium to form a pool 1411 of the liquid composition having a fixed width (FIG. 14A). An ink 1409 is then applied as a droplet to the recording medium (FIG. 14B). As a result, a reaction occurs between the liquid composition and the ink forming the reaction portion 1401. On the other hand, the reaction between the liquid composition and the ink is not so strong that the ink portion not participated in the reaction oozes into the periphery of the pool 1411 to form the ink-ooze portion 1403 (FIG. 14C). In the ink-ooze portion 1403, the coloring material in the ink penetrates with the aqueous medium of the ink into the interior of the recording medium. Therefore, feathering, though minute, occurs at the periphery of the colored portion. This feathering is considered to greatly contribute to the reduction or disappearance of white stripes, one of the greatest advantages of the present invention. In the ink-ooze portion 1403, the fine particles are substantially not present, or slight if any.

Figure 14F:
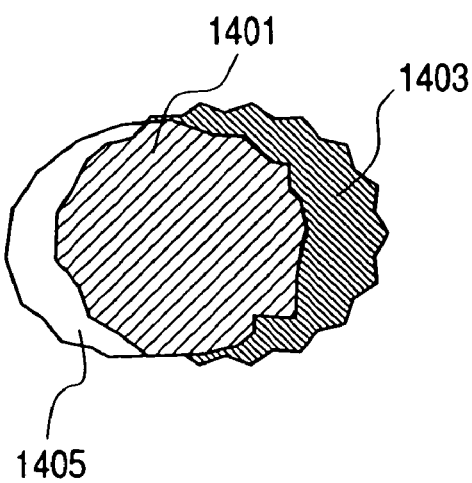

FIGS. 14A to 14C show the case where the ink and the liquid composition are applied on the same position. FIGS. 14D to 14F illustrate a forming process of a colored portion of an ink-jet recorded image according to another aspect of the present invention, where the application positions of both liquids are overlapping but not the same. In FIGS. 14D to 14F, reference numerals indicate the same portions or components as in FIGS. 14A to 14C. Reference numeral 1405 indicates a region formed from the liquid composition alone (hereinafter referred to as "liquid composition portion"), which is formed because the application positions are not completely superimposed. Such a colored portion is formed, for example, in the following manner.

First, a liquid composition is applied as a droplet to a recording medium to form a pool 1411 of the liquid composition of a fixed width (FIG. 14D). Then an ink 1409 is applied as a droplet to the recording medium (FIG. 14E). As a result, a reaction occurs between the liquid composition and the ink to form the reaction portion 1401. On the other hand, the ink portion not participated in the reaction with the liquid composition and oozed at the periphery of the pool 1411 and the ink portion applied outside the pool form the ink-ooze portion 1403, while the liquid composition portion 1405 is formed with the liquid composition not reacted with the ink 1409 because of the difference of the application positions (FIG. 14F). In the ink-ooze portion 1403, the coloring material in the ink penetrates with the aqueous medium of the ink into the interior of the recording medium. Therefore, feathering is caused at the periphery of the colored portion. The optical density of the reaction portion 1401 is high although the reaction of the coloring material with the fine particles is not sufficient. Thus, the reaction portion is considered to contribute to the reduction or disappearance of white stripes, which is one of the greatest advantages of the present invention. In the ink-ooze portion 1403, the fine particles are substantially not present, or slight if any.

Above described is the dot formation with an ink set comprised of an ink and a liquid composition of the present invention, but the same phenomenon is observed in the entire image-forming region. Explanation using drawings is omitted for brevity's sake. In this case also, reduction or disappearance of white stripes in the printed portion, that is one of the greatest advantages of the present invention, is due to the ink feathering at the periphery of the colored portion when the liquid composition and the ink are applied on the same location, or when the application positions of both liquids in the colored portion are different from each other.

The aqueous ink and liquid composition which characterize the present invention will hereinafter be described in detail. First, a cationic ink or anionic ink in the present specification is defined. When the ionic characteristics of an ink are mentioned, it is well known in the art that the ink itself is not charged, but neutral. The term "anionic ink" or "cationic ink" as used herein means that a component of the ink, for example, a coloring material, has an anionic or cationic group, or its surface has been treated with a compound having an anionic or cationic group, which groups are adjusted so as to behave as an anionic or cationic group in the ink. The same is said with the anionic or cationic liquid composition.

<Liquid Composition>

The liquid composition is described.

—Fine Particles—

Actions expected to the fine particles used in the present invention are, for example, 1) adsorption of a coloring material without impairing the inherent coloring ability of the coloring material on mixing; and 2) breakdown of the dispersion stability when they are mixed with an ink or applied to a recording medium, so as to remain on the surface of the recording medium. Fine particles showing such actions are preferably used. Incidentally, fine particles of one or more kinds may be used for such actions.

For action 1), they may have an ionicity opposite to the coloring material used to adsorb the coloring material electrostatically. When the coloring material is anionic, cationic fine particles are used, while anionic fine particles are used when the coloring material is cationic. Besides the ionicity, adsorption of the coloring material is affected by the size and weight of the fine particles, and the surface profile thereof. For example, porous fine particles having many pores on the surface thereof exhibit specific adsorption characteristics and can adsorb the coloring material by virtue of a plurality of factors such as size and shape of the pores.

Action 2) is triggered by an interaction with an ink or a recording medium. Therefore, the action may be achieved by respective constitutions thereof. For example, the fine particles may exhibit an ionicity opposite to the components of the ink and the recording material. The dispersion stability is also affected by the presence of electrolytes in the ink or liquid composition.

In the present invention, it is desirable at least one of the actions 1) and 2) occurs instantly. It is further preferable that both actions 1) and 2) occur instantly. Liquid compositions containing the respective ionic fine particles will hereinafter be described specifically.

[Cationic Liquid Composition]

Cationic Fine Particles

Cationic fine particles are fine particles exhibiting a plus zeta potential value.

The surface nature of the fine particles in a dispersion system is determined by the electrical double layer formed at the interface between the dispersoid and the dispersion medium. Practically, the zeta potential obtained from an electrophoretic mobility or the like is considered, instead. The value of the zeta potential is strongly controlled by the OH ion concentration at the interface. Accordingly, the surface nature of the fine particles is greatly affected by the pH of the liquid composition.

The zeta potential of the cationic fine particles in the present invention is preferably +5 to +90 mV. An image of high density and saturation was obtained in the above range, though the reason for it is not clearly known. More preferably, with a range of from +10 to +85 mV, stripy irregularity caused by head scanning can be reduced, and further with a range of from +15 to +65 mV an image having extremely excellent coloring property can be provided irrespective of the kind of recording paper.

pH may be adjusted so that the zeta potential comes in the above range. However, the pH is desirably in a range of from 2 to 11.5 because too low or too high pH may cause corrosion of members of an ink-jet recording apparatus.

Therefore, the fine particles used in the liquid composition in the present invention, which are cationic at the surfaces thereof, are not only naturally cationic fine particles but also fine particles being electrostatically anionic or neutral by nature but having cationic surface by a treatment, No particular limitation is imposed on the kind of material for the cationic fine particles preferably used in the present invention, and specific examples thereof include inorganic fine particles, organic fine particles, and inorganic and organic combined fine particles. Examples of the inorganic fine particles include cationized fine particles of silica, alumina, alumina hydrate, titania, zirconia, boria, silicaboria, ceria, magnesia, silicamagnesia, calcium carbonate, magnesium carbonate, zinc oxide and hydrotalcite. Examples of the organic fine particles include cationic emulsions and latexes of styrene-acrylic acid or acrylic ester copolymers, methacrylic ester copolymers, conjugated diene copolymers such as SBR latexes, and vinyl copolymers such as ethylene-vinyl acetate copolymers, as well as the cationically modified products of melamine beads, plastic pigments and the like. Examples of the inorganic and organic combined fine particles include inorganic fine particles having a functional group on the surface such as primary, secondary or tertiary amines.

In view of coloring and uniform coloring abilities, storage stability, etc, the cationic fine particles preferably have an average particle diameter within a range of from 0.005 to 1 μm determined by the dynamic light scattering method. When the average particle diameter is not within this range, the fine particles may excessively penetrate into the recording medium to lower the coloring and uniform coloring abilities, or they may precipitate in the liquid composition to lower the storage stability of the liquid composition. The average particle diameter is more preferably within a range of from 0.01 to 0.8 μm. Use of such fine particles can make the rub-off resistance and texture of a printed image on a recording medium particularly preferable.

The content of the cationic fine particles in the liquid composition used in the present invention may be suitably determined within an optimum range according to the kind of substance used. However, it is preferably within a range of from 0.1 to 40% by weight, more preferably from 1 to 30% by weight, most preferably from 3 to 15% by weight from the viewpoint of achieving the objects of the present invention. In such a range, an image excellent in coloring can be stably obtained irrespective of the kind of paper used. In addition, the storage stability and ejection stability of the liquid composition also become excellent.

—Acid—

An acid plays a role of ionizing the surfaces of the cationic fine particles to enhance surface potential, thereby enhancing the dispersion stability of the fine particles in a liquid, and moreover enhancing the adsorbing ability of an anionic compound in an ink and adjusting the viscosity of the liquid composition. No particular limitation is imposed on the acid suitably used in the present invention so far as it brings about the desired pH, zeta potential, and physical properties such as dispersibility of the fine particles. It may be freely selected for use from following inorganic acids and organic acids, for example.

Specific examples of the inorganic acids include hydrochloric acid, sulfuric acid, sulfurous acid, nitric acid, nitrous acid, phosphoric acid, boric acid and carbonic acid. The organic acids may be carboxylic acids, sulfonic acids and amino acids as mentioned below. Examples of the carboxylic acids are formic acid, acetic acid, chloroacetic acid, dichloroacetic acid, trichloroacetic acid, fluoroacetic acid, trimethylacetic acid, methoxy-acetic acid, mercaptoacetic acid, glycolic acid, propionic acid, butyric acid, valeric acid, caproic acid, caprylic acid, capric acid, lauric acid, myristic acid, palmitic acid, stearic acid, oleic acid, linoleic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, o-aminobenzoic acid, m-aminobenzoic acid and p-amino-benzoic acid. Examples of the sulfonic acids include benzenesulfonic acid, methylbenzenesulfonic acid, ethylbenzenesulfonic acid, dodecylbenzenesulfonic acid, 2,4,6-trimethylbenzenesulfonic acid, 2,4-dimethyl-benzenesulfonic acid, 5-sulfosalicylic acid, 1-sulfo-naphthalene, 2-sulfonaphthalene, hexanesulfonic acid, octanesulfonic acid and dodecanesulfonic acid. Examples of the amino acids are glycine, alanine, valine, α-aminobutyric acid, γ-aminobutyric acid, β-alanine, taurine, serine, α-amino-n-caproic acid, leucine, norleucine and phenylalanine.

These may be used either singly or in any combination thereof in the liquid composition used in the present invention. Among these, in particular, acids having a primary dissociation constant pKa in water of 5 or less may be preferably used to enhance the dispersion stability of cationic fine particles and the ability to adsorb anionic compounds. Specific examples thereof are hydrochloric acid, nitric acid, sulfuric acid, phosphoric acid, acetic acid, formic acid, oxalic acid, lactic acid, maleic acid and malonic acid.

—Other Components—

Other components constituting the cationic liquid composition will now be described specifically. The cationic liquid composition used in the present invention may further contain a water-soluble organic solvent and other additives. Examples of the water-soluble organic solvent used herein include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, 1,2,6-hexanetriol, glycerol, N-methyl-2-pyrrolidone, 1,3-dimethylimidazolidinone, triethanolamine, sulfolane and dimethyl sulfoxide. No particular limitation is imposed on the content of the water-soluble organic solvent. However, it is preferably within a range of from 5 to 60% by weight, more preferably from 5 to 40% by weight based on the total weight of the liquid composition.

Besides the above components, additives such as viscosity modifiers, pH adjustors, antiseptics, various surfactants, antioxidants, evaporation accelerators, water-soluble cationic compounds and binder resins may be suitably incorporated as needed. The selection of the surfactants is particularly important from the viewpoint of controlling the penetrability of the liquid composition into a recording medium. The water-soluble cationic compounds may be freely selected so far as the action and effect of the present invention is not impeded, for example, in order to impart additional cationic nature to the liquid composition.

Specifically, as the water-soluble cationic compound, one or more compounds may be selected from polyallylamine, polyamine sulfone, polyvinylamine, chitosan, and neutralized products or partially neutralized products thereof with an acid such as hydrochloric acid or acetic acid; partially cationized products of high-molecular nonionic compounds such as copolymers of vinylpyrrolidone and an aminoalkylalkylate quaternary salt, and copolymers of acrylamide and an aminomethylacrylamide quaternary salt; other primary, secondary and tertiary amine salt type compounds and amino acid type amphoteric compounds. The binder resins may be used in combination within a limit not impeding the texture of the recording medium used and the storage stability and ejection stability of the liquid composition, for example, to further improve the rub-off resistance of the printed image, and may be freely selected from water-soluble polymers, emulsions, latexes, etc.

—Surface Tension of the Liquid Composition—

The liquid composition used in the present invention is preferably colorless or white, but may be toned according to the color of the recording medium used. Preferable physical properties of the liquid composition as described above are, the surface tension in a range of from 10 to 60 mN/m (dyne/cm), preferably 10 to 40 mN/m (dyne/cm), and the viscosity in a range of from 1 to 30 cP.

[Anionic Liquid Composition]

—Anionic Fine Particles—

The anionic fine particles are fine particles exhibiting a minus zeta potential value.

The zeta potential of the anionic fine particles in the present invention is preferably −5 to −90 mV. An image of high density and saturation is obtained in the above range, though the reason for it is not clearly known. More preferably, with a range of from −10 to −85 mV stripy irregularity caused by head scanning can be reduced further, and with a range of from −15 to −65 mV an image having extraordinarily excellent coloring can be obtained irrespective of the kind of recording paper.

Although pH is adjusted to make the zeta potential in the above range, the pH is desirably adjusted to a range of from 2 to 11.5 because too low or too high pH may cause corrosion of members of an ink-jet recording apparatus.

Therefore, as the fine particles anionically charged at the surfaces thereof to be used in the liquid composition, it can be used not only inherently anionic fine particles, but also fine particles which are electrostatically cationic or neutral in nature but treated to have an anionic surface.

No particular limitation is imposed on the kind of material for the anionic fine particles preferably used in the present invention, and specific examples thereof include inorganic fine particles, organic fine particles, and inorganic and organic combined fine particles. Examples of the inorganic fine particles include anionized fine particles of silica, titania, zirconia, boria, silicaboria, ceria, magnesia, silicamagnesia, calcium carbonate, magnesium carbonate and zinc oxide. Examples of the organic fine particles include anionic emulsions and latexes of styrene-acrylic acid or acrylic ester copolymers, methacrylic ester copolymers, conjugated diene copolymers such as SBR latexes, and vinyl copolymers such as ethylene-vinyl acetate copolymers, and anionically modified products of melamine beads, plastic pigments and the like. Examples of the inorganic and organic combined fine particles include inorganic fine particles having a kind of functional group exhibiting anionic nature in water on the surface.

Like the cationic fine particles described above, the anionic fine particles used in the present invention preferably have an average particle diameter within the range of from 0.005 to 1 µm as determined by the dynamic light scattering method when coloring and uniform coloring of the printed image and storage stability of the liquid composition are considered. The average particle diameter is more preferably within a range of from 0.01 to 0.8 µm. When such particles are used, the rub-off resistance and texture of the printed image on a recording medium are particularly preferable.

The content of such anionic fine particles as described above may be suitably determined within an optimum range according to the kind of substance used. However, it is preferably within a range of from 0.1 to 40% by weight, more preferably from 1 to 30% by weight, most preferably from 3 to 15% by weight from the viewpoint of achieving the objects of the present invention. In such a range, an image excellent in coloring can be stably obtained irrespective of the kind of recording paper used. In addition, the storage stability and ejection stability of the liquid composition are also excellent.

—Base—

A base plays a role of ionizing the surfaces of the anionic fine particles to enhance surface potential, thereby enhancing the dispersion stability of the fine particles in a liquid, and moreover enhancing the adsorbing ability of a cationic compound in an ink and adjusting the viscosity of the liquid composition. No particular limitation is imposed on the base suitably used in the present invention so far as it brings about the desired pH, zeta potential, and physical properties such as dispersibility of the fine particles. It may be freely selected from following inorganic compounds and organic compounds, for example.

Specifically, there may be used, for example, sodium hydroxide, lithium hydroxide, sodium carbonate, ammonium carbonate, ammonia, sodium acetate, ammonium acetate, morpholine, and alkanolamines such as monoethanolamine, diethanolamine, triethanolamine, ethylmonoethanolamine, n-butylmonoethanolamine, dimethylethanolamine, diethylethanolamine, ethyldiethanolamine, n-butyldiethanolamine, di-n-butyl-ethanolamine, monoisopropanolamine, diisopropanolamine and triisopropanolamine. Among them, bases having a primary dissociation constant pKa in water of 5 or less may be particularly preferable for use because the dispersion stability of anionic fine particles and the ability to adsorb cationic compounds become excellent.

—Other Components—

Other components constituting the anionic liquid composition will now be described specifically. The anionic liquid composition used in the present invention comprises the anionic fine particles as an essential component and preferably contains such a base as described above, and besides generally includes water as a liquid medium. However, the liquid composition may further contain a water-soluble organic solvent and other additives, for example, viscosity modifiers, pH adjustors, antiseptics, various surfactants, antioxidants, evaporation accelerators, water-soluble anionic compounds and binder resins, may be suitably incorporated.

—Surface Tension of the Liquid Composition—

The liquid composition used in the present invention is preferable colorless or white, but may be toned according to the color of the recording medium used. Preferable physical properties of the liquid composition as described above are: surface tension in the range of from 10 to 60 mN/m (dyne/cm), preferably 10 to 40 mN/m (dyne/cm), and viscosity in the range of from 1 to 30 cP.

<Ink>

The inks constituting the ink sets according to the present invention will now be described. In the present invention, the ink set means a combination of the liquid composition according to the present invention and at least one ink containing a substance reactive to the liquid composition. On the other hand, an ink subset means an ink set from which the liquid composition according to the present invention is omitted. The inks used in the present invention contains a water-soluble dye, a water-insoluble dye, a pigment or the like as a coloring material. The coloring material is desirably reactive with the fine particles in the liquid composition. This reaction is considered to provide an image of high saturation and density. The ink further contains water, a water-soluble organic solvent and other components, for example, a viscosity modifier, a pH adjustor, an antiseptic, a surfactant, an antioxidant, etc., as needed.

A. Anionic Ink

An aqueous anionic ink constituting an ink set of the present invention in combination with a cationic liquid composition described above will now be described. The anionic ink used in the present invention contains a water-soluble dye having an anionic group as a coloring material. When a water-insoluble dye or a pigment is used as a coloring material, an anionic compound is preferably used in combination with the coloring material. In addition to the coloring material, the anionic ink in the present invention further contains water, a water-soluble organic solvent and other components, for example, a viscosity modifier, a pH adjustor, an antiseptic, a surfactant, an antioxidant, rust preventives, antimold agents, evaporation accelerators, chelating agents and water-soluble polymers in addition to the above-described components, etc., as needed. These individual components for the ink will hereinafter be described.

—Water-Soluble Dye—

No particular limitation is imposed on the water-soluble dyes having an anionic group used in the present invention so far as they are listed in the Color Index, for example, water-soluble acid dyes, direct dyes or reactive dyes. Dyes not listed in the Color Index may also be used without any particular limitation so far as they have an anionic group, for example, a sulfonic group or a carboxylic group. The water-soluble dyes used herein include those having pH dependent solubility.

—Pigment—

Another aspect of the aqueous anionic ink is an ink containing a pigment and an anionic compound in place of a water-soluble dye having an anionic group as described. It further contains water, a water-soluble organic solvent and other optional components such as a viscosity modifier, a pH adjustor, an antiseptic, a surfactant, and an antioxidant. In such an ink, the anionic compound may be contained as a dispersing agent for the pigment. The dispersing agent for the pigment may not be anionic, so long as the ink contains an anionic compound. Of course, when the dispersing agent is anionic, another anionic compound may be added.

No particular limitation is imposed on pigments usable in the present invention. However, for example, pigments described below may be preferably used.

As carbon black used in black pigment inks, is preferably those produced by the furnace process or channel process having the primary particle diameter of from 15 to 40 mµ, the specific surface area of from 50 to 300 m$^2$/g as measured by the BET method, the oil absorption of from 40 to 150 ml/100 g as determined by using DBP, the volatile matter of from 0.5 to 10%, and pH of from 2 to 9. Examples of commercially-available carbon black having such properties include No. 2300, No. 900, MCF88, No. 40, No. 52, MA7, MA8 and No. 2200B (all, products of Mitsubishi Chemical Corp.) RAVEN 1255 (product of Columbian Carbon Japan Limited), REGAL 400R, REGAL 660R and MOGUL L (all, products of CABOT CO.), and Color Black FW1, Color Black FW18, Color Black S170, Color Black S150, Printex 35 and Printex U (all, products of Degussa AG). It may be newly prepared for the present invention.

Examples of pigments used in yellow inks include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83.

Examples of pigments used in magenta inks include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112 and C.I. Pigment Red 122.

Examples of pigments used in cyan inks include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6.

Also, they may be those newly prepared for the present invention.

—Dispersing Agent for Pigment—

As a dispersing agent for pigment in the present invention, any water soluble resin may be used so far as it can disperse a pigment stably in water or an aqueous medium by the action of an anionic group. However, those having a weight average molecular weight ranging from 1,000 to 30,000, more preferably from 3,000 to 15,000 are particularly preferred. Specific examples of such water-soluble resins include block copolymers, graft copolymers and random copolymers composed of at least two monomers selected from hydrophobic monomers such as styrene, styrene derivatives, vinylnaphthalene, vinylnaphthalene derivatives and aliphatic alcohol esters of α,β-ethylenically unsaturated carboxylic acids, and hydrophilic monomers such as acrylic acid and derivatives thereof, maleic acid and derivatives thereof, itaconic acid and derivatives thereof, and fumaric acid and derivatives thereof, and salts of these copolymers. These resins are alkali-soluble resins which dissolve in an aqueous solution of a base.

Besides, homopolymers composed of a hydrophilic monomer, or salts thereof may also be used. Further, water-soluble resins such as polyvinyl alcohol, carboxymethyl cellulose and condensates of naphthalenesulfonic acid and formaldehyde may also be used. However, use of an alkali-soluble resin has a merit that the viscosity of the resulting dispersion becomes lower, and dispersing operation easier. These water-soluble resins are preferably used within a range of from 0.1 to 5% by weight based on the total weight of the ink.

The pigment inks used in the present invention are prepared by dispersing or dissolving such pigment and water-soluble resin as described above in an aqueous medium. The aqueous medium preferably used in the pigment inks is a mixed solvent of water and a water-soluble organic solvent. As the water, it is preferable to use ion-exchanged water (deionized water) instead of tap water containing various ions.

Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones such as acetone; ethers such as tetrahydrofuran and dioxane; polyalkylene glycols such as polyethylene glycol and polypropylene glycol; alkylene glycols of which alkylene moiety has 2 to 6 carbon atoms such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether and diethylene glycol monomethyl (or monoethyl) ether; N-methyl-2-pyrrolidone; 1,3-dimethyl-2-imidazolidinone; sulfolane; dimethyl sulfoxide; cyclic amide compounds such as 2-pyrrolidone and ε-caprolactam; and imide compounds such as succinimide.

The content of the water-soluble organic solvent in each ink is generally within a range of from 1 to 40% by weight, preferably from 3 to 30% by weight based on the total weight of the ink, while the content of water in the ink is within a range of from 30 to 95% by weight. If the amount of water is less than 30% by weight, the solubility of the coloring material is deteriorated, and the viscosity of the resulting ink is increased. It is hence not preferable to use water in such a small amount. On the other hand, if the amount of water is greater than 95% by weight, the vaporizing component is too great to sufficiently satisfy the fixation properties.

When the dispersing agent is not an anionic polymer, it is preferable to further add an anionic compound to the above-described pigment-containing inks. Examples of such anionic compounds include low-molecular anionic surfactants as well as the high-molecular substances such as the alkali-soluble resins as described above.

Specific examples of the low-molecular anionic surfactants include disodium lauryl sulfosuccinate, disodium polyoxyethylene lauroylethanolamide sulfosuccinate, disodium polyoxyethylene alkyl-sulfosuccinates, carboxylated polyoxyethylene lauryl ether sodium salt, carboxylated polyoxyethylene tridecyl ether sodium salt, sodium polyoxyethylene lauryl ether sulfate, triethanolamine polyoxyethylene lauryl ether sulfate, sodium polyoxyethylene alkyl ether sulfates, sodium alkylsulfates and triethanolamine alkylsulfates. However, the low-molecular anionic surfactants are not limited to these compounds.

The used amount of such an anionic substance as described above is preferably within a range of from 0.05 to 10% by weight, more preferably from 0.05 to 5% by weight based on the total weight of the ink.

—Self-Dispersing Pigment—

As a pigment usable in the anionic inks, it may be used a self-dispersing pigment which can be dispersed in water or an aqueous medium without using any dispersing agent. The self-dispersing pigment is a pigment having at least one kind of anionic hydrophilic group bonded directly or through another atomic group to the surface. The anionic hydrophilic group may be at least one selected from, for example, the following hydrophilic groups, —COOM, —$SO_3M$, —$SO_2NH_2$, —$PO_3HM$ and —$PO_3M_2$ wherein M is hydrogen, alkali metal, ammonium or organic ammonium; and the bridging another atomic group may be an alkylene group having 1 to 12 carbon atoms, a phenylene group which may be substituted, or a naphthylene group which may be substituted.

Since the above-described carbon black anionically charged by introducing the hydrophilic group into the surface of carbon black exhibits excellent dispersibility in water by virtue of repulsion of the ion thereof, it retains a stably dispersed state without adding any dispersing agent or the like even when it is contained in an aqueous ink.

—Additive Components in Ink—

Besides the above components, a surfactant, an antifoaming agent, an antiseptic and the like may be added to the pigment inks, as needed, to provide them as inks having desired physical properties.

Examples of the surfactant include anionic surfactants such as fatty acid salts, salts of higher alcohol sulfuric esters, salts of liquid fatty oil sulfuric esters and alkylarylsulfonic acid salts; and nonionic surfactants such as polyoxyethylene alkyl ethers, polyoxyethylene alkyl esters, polyoxyethylene sorbitan alkyl esters, acetylene alcohol and acetylene glycol. One or more of these surfactants may be suitable chosen for use. The amount of the surfactant used varies according to the kind of the dispersing agent used, but is desirably within a range of from 0.01 to 5% by weight based on the total weight of the ink. It is preferred that the amount of the surfactant added be determined in such a manner that the surface tension of the resulting ink is at least 30 mN/m (dyne/cm), because the occurrence of deformed printing (inaccurate ink landing) due to wetting of an orifice can be effectively prevented in an ink-jet recording system used in the present invention.

Pigment inks as described above are prepared as follows. First, a pigment is added to an aqueous solution containing at least water and a resin as a dispersing agent. The mixture is stirred and then subjected to a dispersion treatment by dispersing means described later, and if necessary, to a centrifugal treatment to obtain a desired dispersion. Other components as mentioned above are then added to the dispersion and stirred to prepare an ink.

When an alkali-soluble resin is used, a base or amine must be added to dissolve the resin in the dispersion. In this case, the amine or base must be added at least in an amount calculated from the acid value of the resin according to the following equation.

$$\text{Amount (g) of amine or base} = [(\text{acid value of the resin}) \times (\text{molecular weight of the amine or base}) \times (\text{amount of the resin}) (g)]/5600.$$

It is effective to conduct premixing of a pigment suspension for at least 30 minutes before the dispersion treatment. This premixing serves to improve the wettability of the surface of the pigment and facilitate adsorption of the dispersing agent on the pigment surface.

Preferable examples of the base to be added to the dispersion containing the alkali-soluble resin as a dispersant include organic bases such as monoethanolamine, diethanolamine, triethanolamine, aminomethylpropanol and ammonia, and inorganic bases such as potassium hydroxide and sodium hydroxide.

Any ordinary dispersing machine may be employed as a dispersing machine to prepare the pigment ink. Examples thereof include ball mills, sand mills, etc. Of these mills, a high-speed sand mill may preferably be used, such as Super Mill, Sand Grinder, Beads Mill, Agitator Mill, Grain Mill, Dyno Mill, Pearl Mill and Coball Mill (all are trade names).

The anionic inks used in the present invention may also be used for general water-soluble writing utensils, but are particularly suitable for use in an ink-jet recording system of a type that an ink is ejected by the bubbling phenomenon of the ink caused by thermal energy. This recording system has a feature that the ejection of the ink becomes extremely stable, and no satellite dots generate. In this case, the thermal properties (for example, the specific heat, the coefficient of thermal expansion, the heat conductivity, etc.) of the inks may however be controlled in some cases.

B. Cationic Ink

An aqueous cationic ink constituting an ink set of the present invention in combination with an anionic liquid composition described above will now be described. The cationic ink used in the present invention contains a water-soluble dye having a cationic group as a coloring material. When a water-insoluble dye or a pigment is used as a coloring material, an cationic compound is preferably used in combination with the coloring material. In addition to the coloring material, the cationic ink in the present invention further contains water, a water-soluble organic solvent and other components, for example, a viscosity modifier, a pH adjustor, an antiseptic, a surfactant, an antioxidant, rust preventives, antimold agents, evaporation accelerators, chelating agents and water-soluble polymers in addition to the above-described components, etc., as needed. These individual components for the ink will hereinafter be described.

—Water-Soluble Dye—

No particular limitation is imposed on the water-soluble dyes having a cationic group used in the present invention so far as they are listed in the Color Index. Dyes not listed in the Color Index may also be used without any particular limitation so far as they have an cationic group. The water-soluble dyes used herein include those having pH dependent solubility.

—Pigment—

Another aspect of the aqueous anionic ink is an ink containing a pigment and a cationic compound in place of a water-soluble dye having a cationic group as described. It further contains water, a water-soluble organic solvent and other optional components such as a viscosity modifier, a pH adjustor, an antiseptic, a surfactant, and an antioxidant. In such an ink, the cationic compound may be contained as a dispersing agent for the pigment. The dispersing agent for the pigment may not be cationic, so long as the ink contains a cationic compound. Of course, when the dispersing agent is cationic, another cationic compound may be added. No particular limitation is imposed on pigments usable in the present invention. Pigments described in the item of Anionic ink may be suitably used.

—Dispersing Agent for Pigment—

As a dispersing agent for pigment in the present invention, any water soluble resin may be used so far as it can disperse a pigment stably in water or an aqueous medium by the action of a cationic group. Specific examples thereof may include those obtained by polymerization of a vinyl monomer and having a cationic nature in at least a part of the resulting polymer. Examples of a cationic monomer for forming the cationic moiety include salts of such tertiary amine monomers as described below, and quaternized product thereof.

Namely, there are mentioned N,N-dimethylaminoethyl methacrylate $[CH_2=C(CH_3)-COO-C_2H_4N(CH_3)_2]$, N,N-dimethyl-aminoethyl acrylate $[CH_2=CH-COO-C_2H_4N(CH_3)_2]$, N,N-dimethylaminopropyl methacrylate $[CH_2=C(CH_3)-COO-C_3H_6N(CH_3)_2]$, N,N-dimethylaminopropyl acrylate $[CH_2=CH-COO-C_3H_6N(CH_3)_2]$, N,N-dimethylacrylamide $[CH_2=CH-CON(CH_3)_2]$, N,N-dimethylmethacrylamide $[CH_2=C(CH_3)-CON(CH_3)_2]$, N,N-dimethylaminoethylacrylamide $[CH_2=CH-CONHC_2H_4N(CH_3)_2]$, N,N-dimethylaminoethylmethacrylamide $[CH_2=C(CH_3)-CONHC_2H_4N(CH_3)\ 2]$, N,N-dimethylaminopropylacrylamide $[CH_2=CH-CONH-C_3H_6N(CH_3)_2]$ and N,N-dimethylaminopropyl-methacrylamide $[CH_2=C(CH_3)-CONH-C_3H_6N(CH_3)_2]$.

In the case of a tertiary amine, examples of a compound for forming a salt include hydrochloric acid, sulfuric acid and acetic acid. Examples of a compound used in quaternization include methyl chloride, dimethylsulfuric acid, benzyl chloride and epichlorohydrin. Among these, methyl chloride and dimethylsulfuric acid are preferred for preparing a dispersing agent used in the present invention. Such tertiary amine salts or quaternary ammonium compounds as described above behave as a cation in water, and under neutralized conditions, they are stably soluble in an acidic region. The content of these monomers in the copolymer is preferably within a range of from 20 to 60% by weight.

Examples of other monomers used in the formation of the above-described high-molecular dispersing agent include hydrophobic monomers, for example, acrylic esters having a hydroxyl group, such as 2-hydroxyethyl methacrylate; and acrylic esters having a side chain of long ethylene oxide chain; and styrene monomers, and water-soluble monomers soluble in water at a pH of about 7, such as acrylamides, vinyl ethers, vinylpyrrolidones, vinylpyridines and vinyloxazolidines. As the hydrophobic monomers, styrene, styrene derivatives, vinylnaphthalene, vinylnaphthalene derivatives, (meth)acrylic acid alkyl esters and acrylonitrile can be used. In the high-molecular dispersing agent obtained by the copolymerization, the water-soluble monomer be used in the range of from 15 to 35% by weight for the stability of the copolymer in an aqueous solution, and the hydrophobic monomer be used in the range of from 20 to 40% by weight for enhancing the dispersing effect of the copolymer to the pigment.

—Self-Dispersing Pigment—

As a cationically charged carbon black, those having at least one hydrophilic group selected from following quaternary ammonium groups bonded directly or through another atomic group to the surface thereof can be used. However, in the present invention, the hydrophilic groups are not limited thereto.

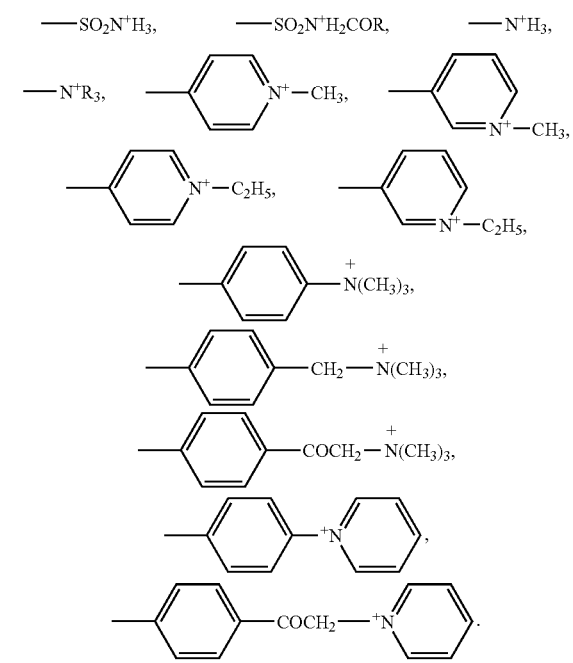

wherein R is a linear or branched alkyl group having 1 to 12 carbon atoms, a substituted or unsubstituted phenyl group, or a substituted or unsubstituted naphthyl group. Incidentally, the above-mentioned cationic groups may have, for example, $NO_3-$ or $CH_3COO-$ as a counter ion.

A preparation method of a cationically charged self-dispersing carbon black due to its hydrophilic group is explained with a method to introduce to carbon black an N-ethylpyridyl group:

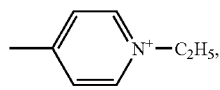

by treating carbon black with 3-amino-N-ethyl pyridinium bromide.

Since the carbon black cationically charged by introducing the hydrophilic group into the surface of carbon black in the above-described manner exhibits excellent dispersibility in water by virtue of repulsion of the ion thereof, it retains a stably dispersed state without adding any dispersing agent or the like even when it is contained in an aqueous ink.

—Surface Tension of Ink—

The cationic inks used in the present invention may desirably be controlled so as to have, as their own physical properties at 25° C., a surface tension of 30 to 68 mN/m (dyn/cm) and a viscosity of 15 mPa·s (cP) or lower, preferably 10 mPa·s (cP) or lower, more preferably 5 mPa·s (cP) or lower from the viewpoints of improving the penetrability of the inks in printed images when printed on plain paper or the like, and at the same time making the matching of the inks with an ink-jet head good.

<Ink Concentration>

The concentration by weight of each coloring material contained in the above-described anionic and cationic inks is suitably selected according to the kind of coloring material such as a water-soluble dye, pigment or self-dispersing pigment, but is preferably within the range of from 0.1 to 20% by weight, particularly from 0.1 to 12% by weight based on the weight of the ink.

Coloring of the formed image becomes especially excellent when the concentration ratio of the fine particles in the liquid composition to the coloring material in the ink are 1.2 or less. more preferably 1.0 or less, provided that the coloring material concentration in the ink is in the range of from 0.3 to 7% by weight.

<Ink-Jet Image Forming Process>

The ink-jet image forming process according to the present invention will now be described. This process comprises the step of conducting a liquid—liquid reaction between an ink containing a anionic or cationic coloring material and a liquid composition containing fine particles having a polarity opposite to the coloring material on a recording medium, where the fine particles in the vicinity of the fiber surface of the recording medium are physically adsorbed on or chemically bonded to the fiber surface of the recording medium; the coloring material is adsorbed on or attached to the surface of the fine particles in the monomolecular state as in the ink, at an interface between the ink and the liquid composition; the coloring material dispersed into the liquid composition is adsorbed on or attached to the surface of the fine particles in the monomolecular state as in the ink; the fine particles which have adsorbed the coloring material on the surface become unstable in their dispersion state to aggregate, and the fine particles having the coloring material on the surface attach onto the surface of the recording medium.

The ink-jet image forming process according to the present invention can be actually carried out by using an anionic or cationic water-base ink containing a coloring material, and the liquid composition containing fine particles having a polarity opposite to the ink in a dispersed state, both of which have been described above. The process for applying these liquid composition and aqueous ink to a recording medium will hereinafter be described.

Figure 1:
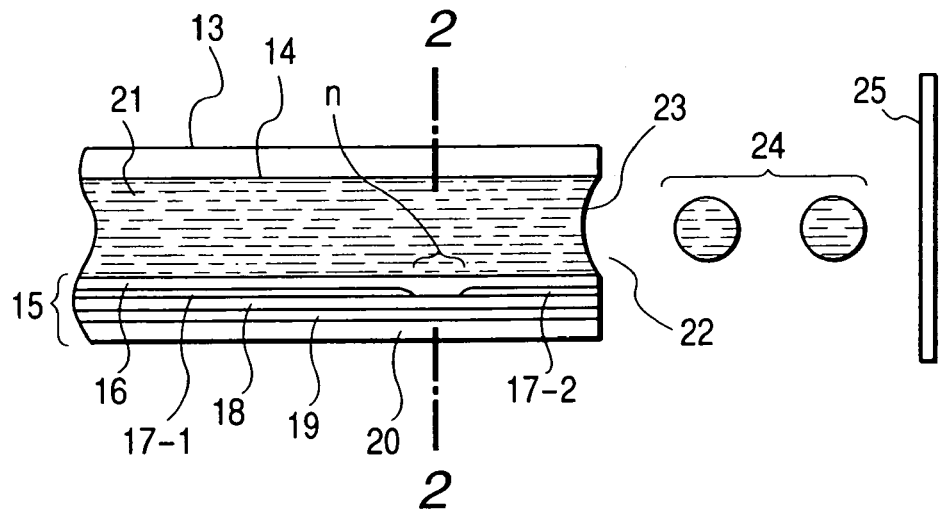
FIG. 1 is a longitudinal cross-sectional view of a head of an ink-jet recording apparatus.
Figure 3:
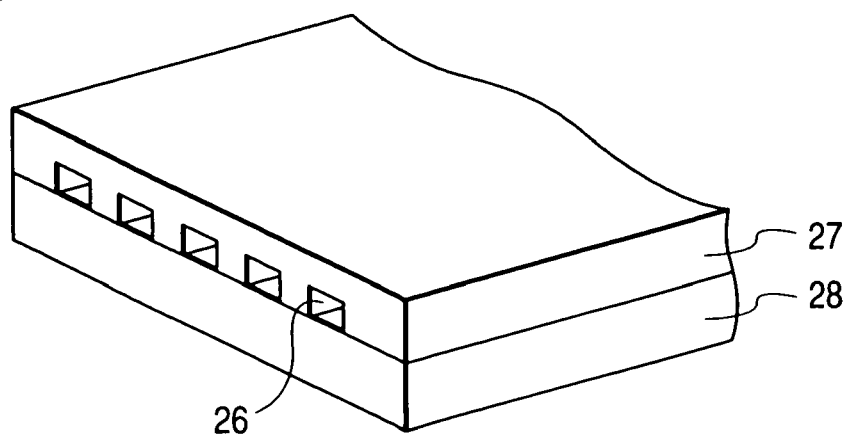
FIG. 3 is a perspective view of the appearance of another head of the ink-jet recording apparatus.

The ink-jet image forming process according to the present invention comprise a step (i) of applying such a liquid composition as described above to a recording medium and a step (ii) of applying the anionic or cationic aqueous ink containing a coloring material to the recording medium, wherein the liquid composition is applied to an image forming region or an image forming region and the vicinity thereof to bring about mutual contact between the ink and the liquid composition in a liquid state. Herein, the term "image-forming region" means a region where the ink dots are applied, and the term "the vicinity of the image-forming region" means an oˆA bˆGach onto the recording medium 25. FIG. 3 schematically illustrates a recording head having an array of nozzles similar to that is shown in FIG. 1. This head is prepared by bonding a glass plate 27 having a number of flow path 26 to a heat generating head 28 similar to that is shown in FIG. 1.

Figure 2:
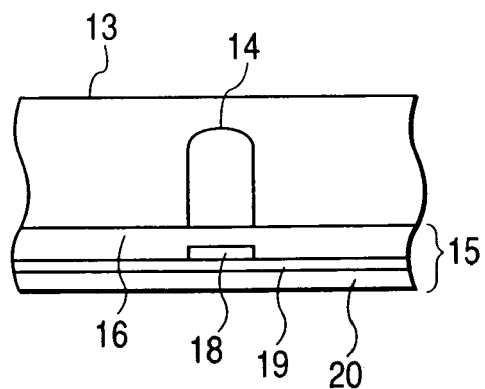
FIG. 2 is a transverse cross-sectional view of the head of the ink-jet recording apparatus.

Here, FIG. 1 is a schematic cross-sectional view of a head 13 taken along an ink flow path, and FIG. 2 is a cross-sectional view taken along line 2—2 in FIG. 1.

Figure 4:
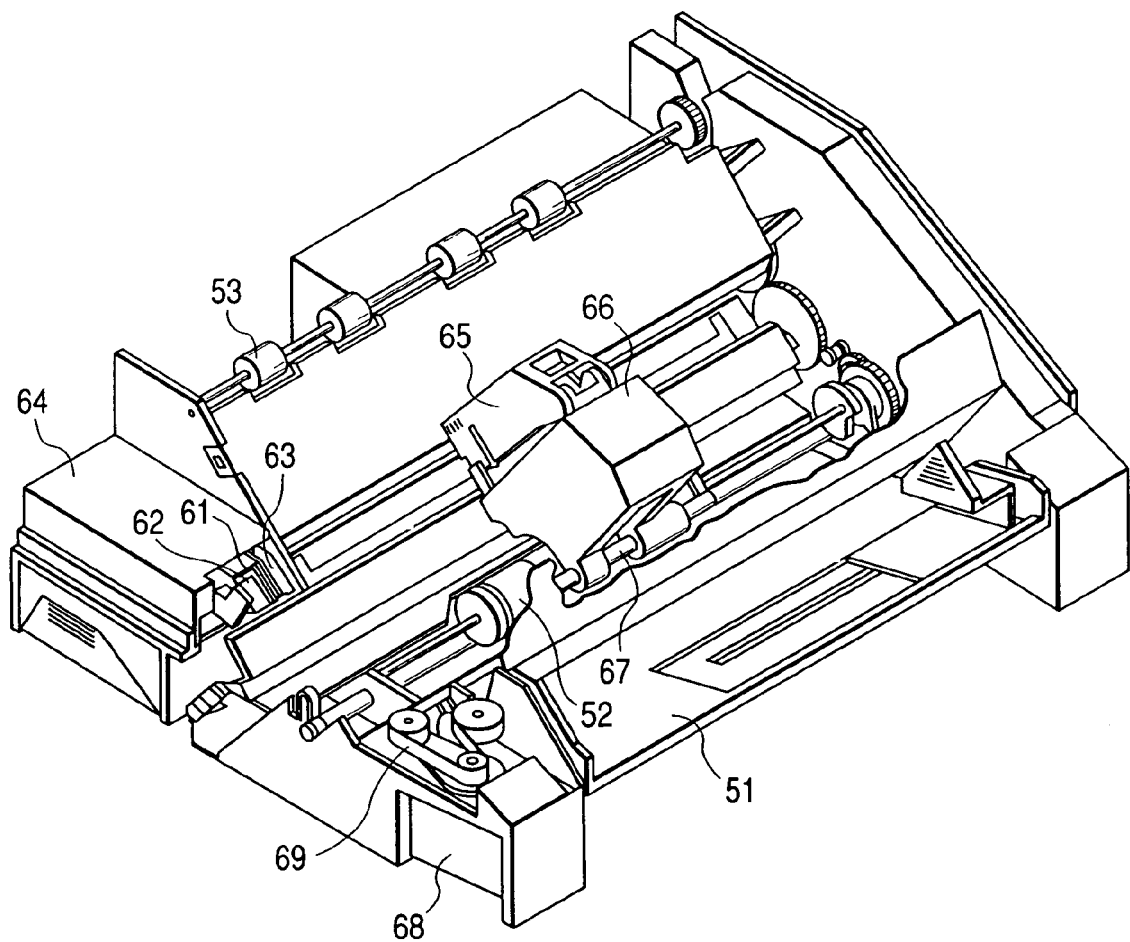
FIG. 4 is a perspective view of an illustrative ink-jet recording apparatus.

FIG. 4 illustrates an example of an ink-jet recording apparatus in which such a head as described above is incorporated. In FIG. 4, the blade 61 is a wiping member, one end of which is a fixed end held by a blade-holding member to cantilever. The blade 61 is provided at a position adjacent to a region in which a recording head 65 operates, and in this aspect, is held in such a form that it protrudes into the path of the recording head 65. Reference numeral 62 designates a cap for an ejection opening of the recording head 65, and the cap is arranged in a home position adjacent to the blade 61, moves in the direction perpendicular to the moving direction of the recording head 65, and caps the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery part 64, and the blade 61 and the ink-absorber 63 serve to remove moisture and dust on the ink-ejecting opening.

Reference numeral 65 designates a recording head. The head contains an energy generating means for ink ejection and performs recording by ejecting ink towards a recording medium opposite to the ink-ejecting opening. Numeral 66 designates a carriage for carrying the recording head 65 to move it. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto.

Reference numeral 51 designates a recording medium feeding part for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the image recording apparatus according to this aspect of the invention, the recording head is moved forward and backward along a direction perpendicular to the recording medium-carrying direction, and in the both forward and backward ways, the head can apply at least one of black ink and color ink to the recording medium.

Recording data processing may be done utilizing conventional technology relating to the both-way printing.

In the above arrangement, while the recording head returns to its home position after recording, the cap 62 of the ejection recovery part 64 recedes from the moving path of the recording head, but the blade 61 is projecting in the moving path. As a result, the ink ejecting opening of the recording head 65 is wiped.

When the cap 62 comes into contact with the ejection opening face of the recording head 65 to cap it, the cap 62 moves so as to protrude into the path of motion of the recording head 65.

When the recording head 65 is moved from its home position to the position at which recording is started, the cap 62 and the blade 61 are at the same positions as the wiping position as described above. As a result, the ejection opening of the recording head 65 is also wiped at the time of this movement.

The above movement of the recording head 65 to its home position is made not only when the recording is completed or for ejection recovery, but also when the recording head 65 is moving in the recording region for recording, that is, it moves to the home position adjacent to the recording region at given intervals during recording, so as to wipe the ejection opening face with this movement.

Figure 5:
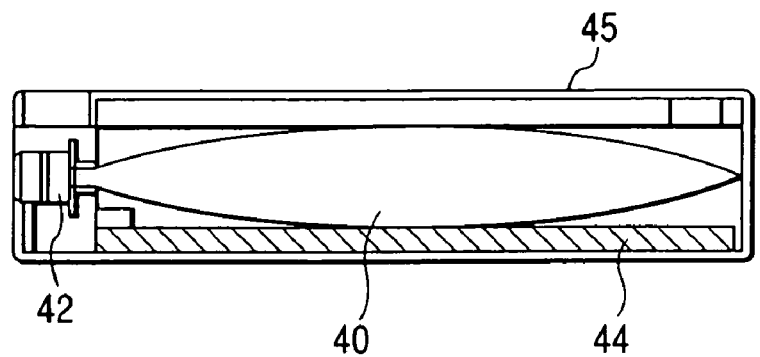
FIG. 5 is a longitudinal cross-sectional view of an ink cartridge.

FIG. 5 shows one example of an ink cartridge for storing ink for feeding ink to the recording head through an ink feeding member such as a tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 designate an ink absorber for receiving waste ink. For the ink storage portion, its surface in contact with ink is preferably made of polyolefin, particularly polyethylene. As another embodiment of the cartridge in the present invention, there is a cartridge which has two storing parts for storing a liquid composition and color ink of an ink set of the invention separately to supply each to the recording head which can discharge the liquid composition and the ink, where the cartridge is designed to be freely detachable from the recording head.

Figure 15:
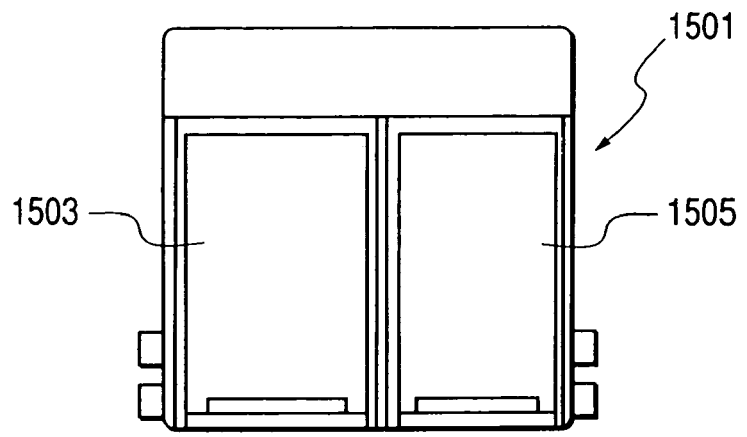
FIG. 15 is a plan view of an ink tank according to the present invention.
Figure 16:
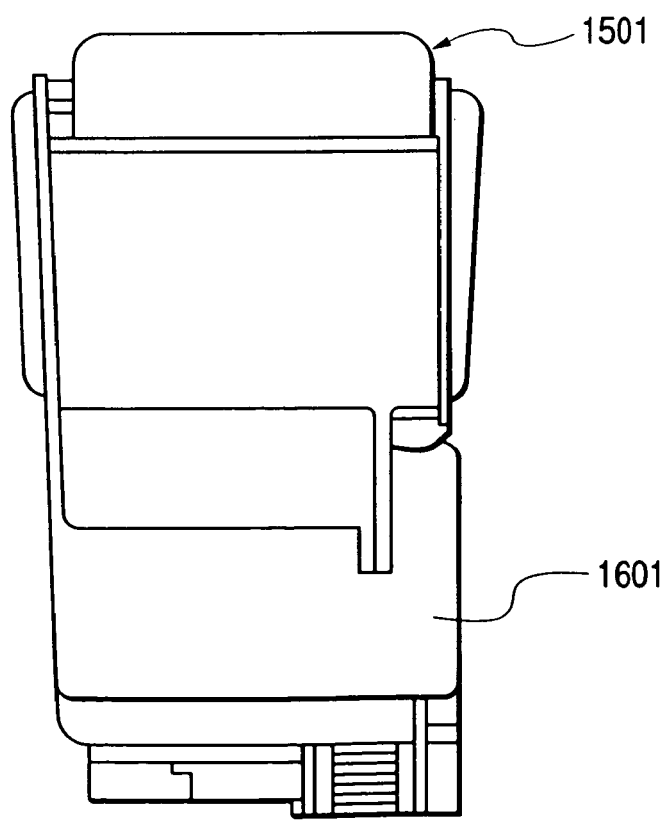
FIG. 16 schematically illustrates a state that the ink tank shown in FIG. 15 has been installed in a recording head.

FIG. 15 shows an example of such a cartridge 1501: 1503 is an ink storing part and 1505 is a liquid composition storing part. The cartridge as shown in FIG. 16 is constituted to be freely detachable from the recording head 1601 and to supply the liquid composition and inks to the recording head 1601 when the cartridge 1501 is mounted to the recording head 1601.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
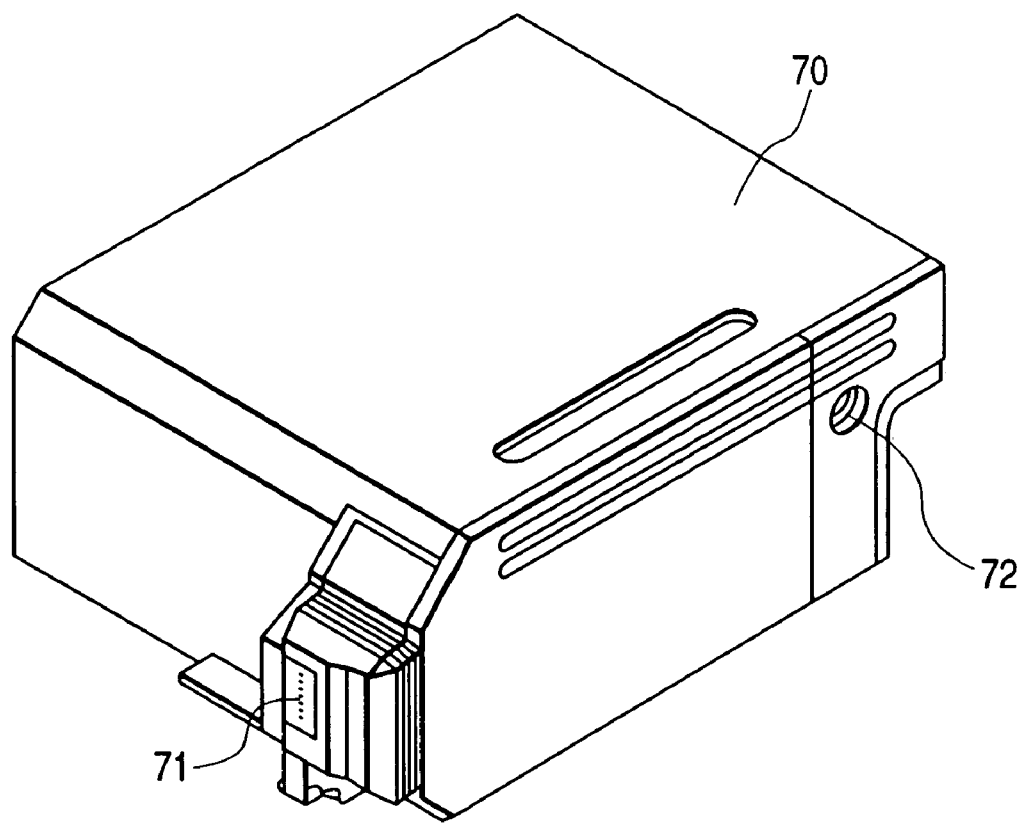
FIG. 6 is a perspective view of a recording unit.

In FIG. 6, reference numeral 70 designates a recording unit containing an ink storing portion containing an ink, for example, an ink-absorbing member in it. The ink contained in the ink-absorbing member is ejected as an ink droplet from a head 71 having a plurality of orifices. As a material for the ink-absorbing member, polyurethane may be preferably used. Reference numeral 72 indicates an air passage for communicating the interior of the recording unit 70 with the atmosphere. This recording unit 70 can be used in place of the recording head 65 shown in FIG. 4, and detachably installed on the carriage 66.

Figure 17:
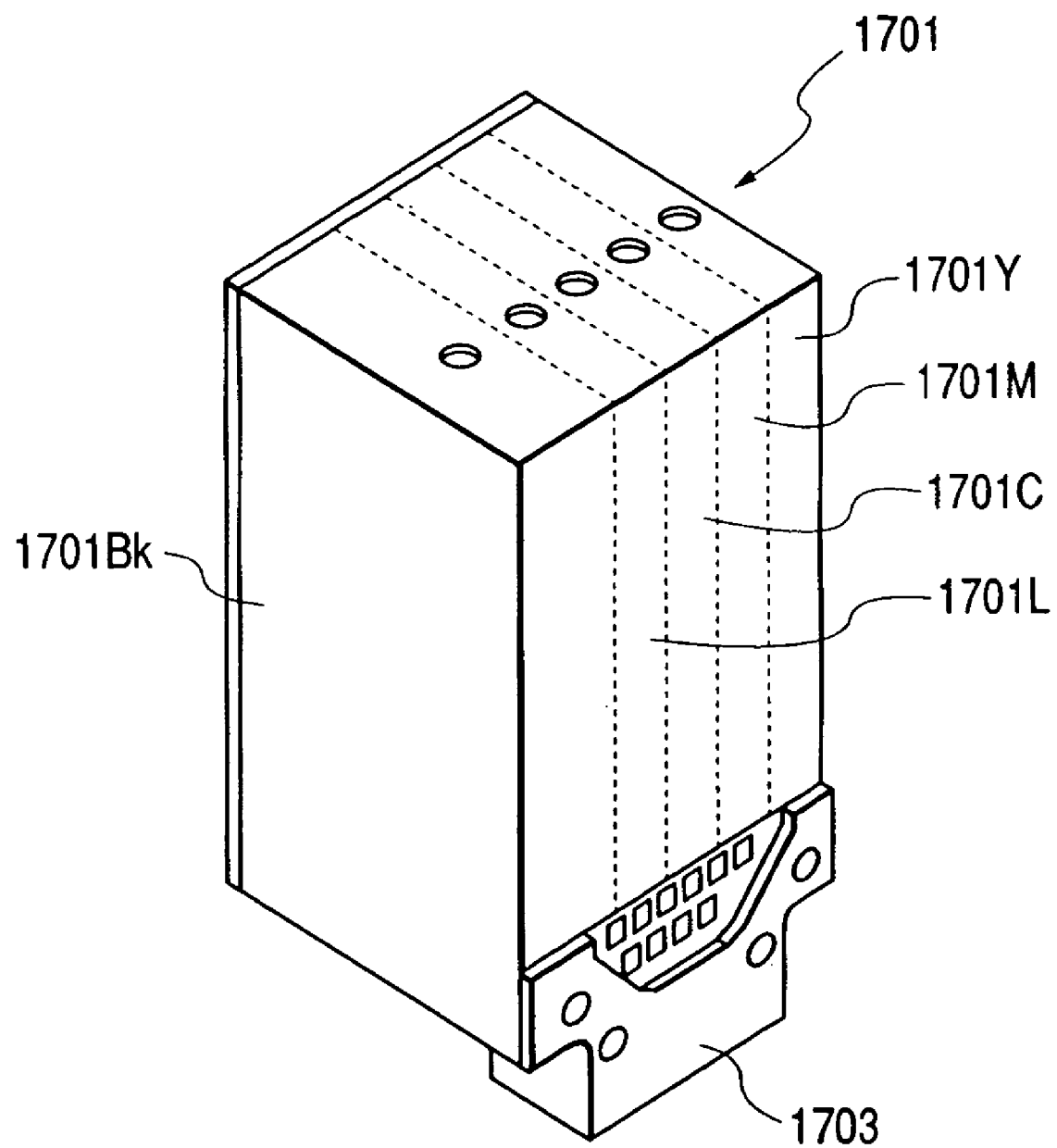
FIG. 17 is a schematic perspective view of an ink cartridge according to the present invention.

Further, as another embodiment of the recording unit in the present invention, there is a recording unit in which the liquid composition and inks are separately stored in the ink storing parts in an ink tank, and the ink tank and the recording head for discharging each ink are united. For example, as shown in FIG. 17, there is a recording unit 1701 united with a recording head 1703, in which the liquid composition is stored in the storing part 1701L, black ink is stored in the storing part 1701Bk, while color inks of yellow, cyan and magenta are stored in the color ink storing parts 1701Y, 1701M and 1701C, respectively, and the recording head is constituted to have divided ink flow paths so as to discharge the inks separately.

In addition to the ink-jet recording apparatus utilizing thermal energy as described above, the present invention is applicable to a recording apparatus having an ink-discharging system utilizing dynamic energy for ink ejection, e.g., an ink jet recording apparatus of a piezo system using a piezoelectric element.

Figure 7:
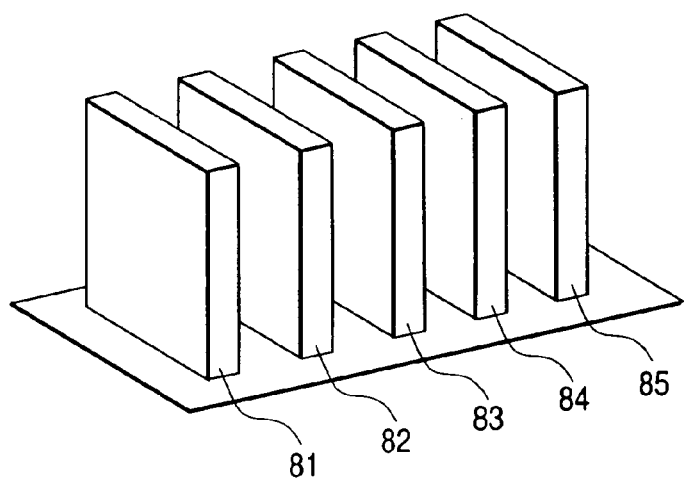
FIG. 7 is a perspective view illustrating a recording unit used in examples of the present invention, in which a plurality of recording heads are arranged.
Figure 8:
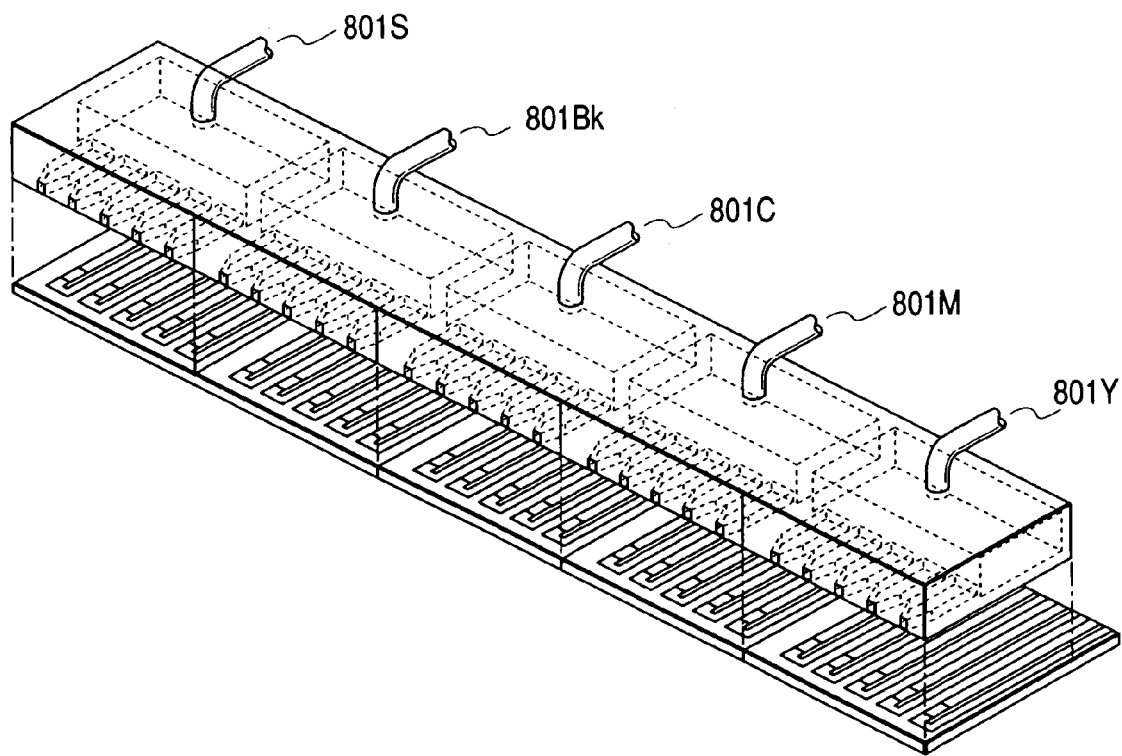
FIG. 8 is a perspective view of another recording head used in the present invention.
Figure 9:
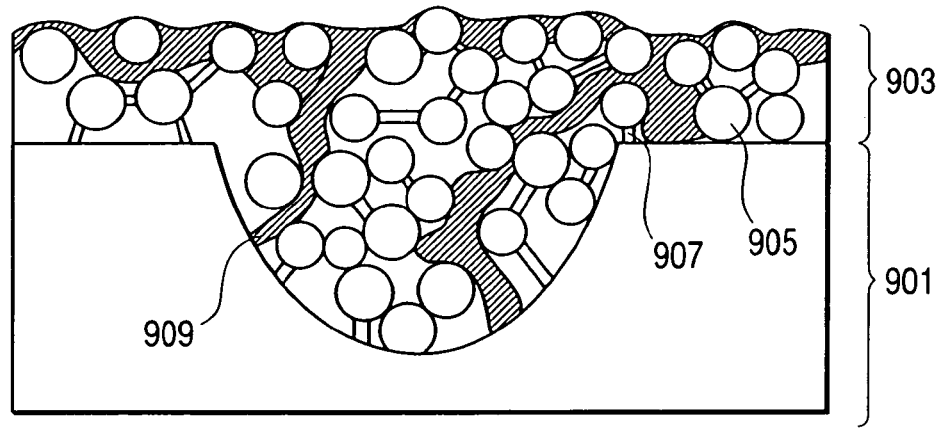
FIG. 9 is a typical cross-sectional view of a colored portion when ink-jet recording has been conducted on coated paper.
Figure 10A:
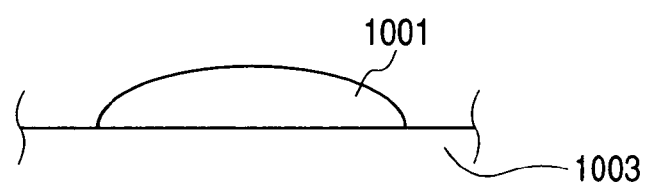
FIGS. 10A, 10B and 10C illustrate two-liquid ink-jet recording.
Figure 10B:
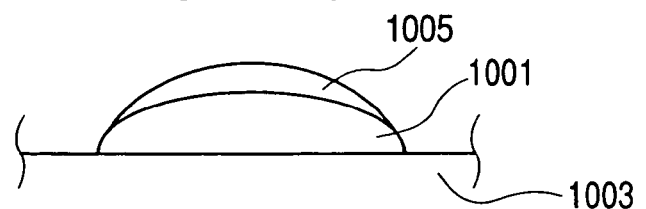
Figure 10C:
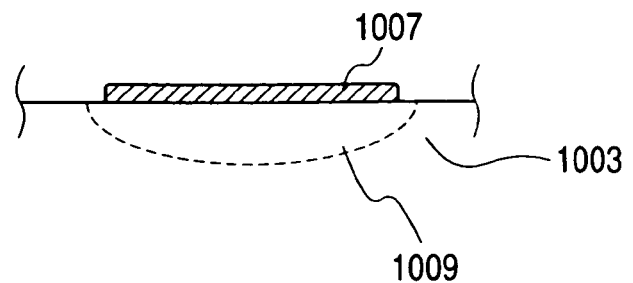

To carry out the ink-jet image forming process according to the present invention, one can use a recording apparatus, for example, having five recording heads, each of which has been illustrated in FIG. 3, arranged on a carriage. An example thereof is illustrated in FIG. 7. Reference numerals 81, 82, 83 and 84 indicate recording heads for ejecting yellow, magenta, cyan and black inks, respectively. Reference numeral 85 designates a head for ejecting the liquid composition used in the present invention. The heads are arranged in the above-described recording apparatus and serve to eject the respective recording inks of the different colors according to recording signals. Before the ejection of the inks, the liquid composition is applied in advance to at least portions of recording paper where the recording inks of the different colors are to be applied thereto. The present invention is not limited to the above described apparatus having five heads as shown in FIG. 7. It is also preferable to use an apparatus as shown in FIG. 8 having one head and separated flow paths of the inks of yellow 801Y, magenta 801M, cyan 801C and black 801Bk, and the colorless liquid composition 801S. Of course, the head construction may be changed so as to reverse the recording order of the liquid composition and the inks as described above.

Figure 18:
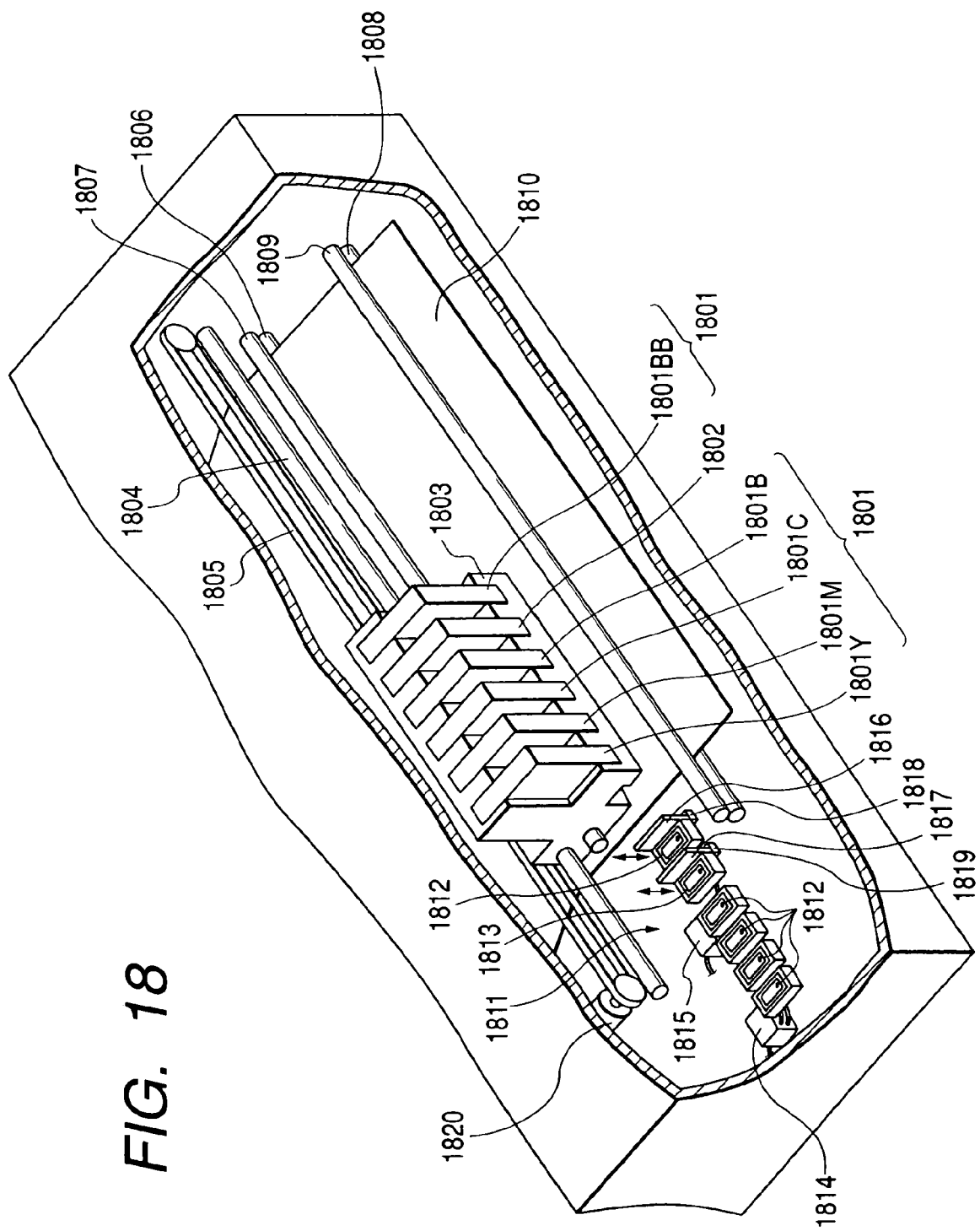
FIG. 18 is a partly broken perspective view typically illustrating an ink-jet printer according to an embodiment of the present invention.

FIG. 18 is a perspective view schematically illustrating the construction of an ink-jet printer according to another aspect of the present invention.

In FIG. 18, the reference numeral 1804 indicates a scanning rail extending in a main scanning direction of a carriage 1803 and slidably supporting the carriage 1803, and reference numeral 1805 designates a pulley for transmitting driving force to reciprocate the carriage 1803. Reference numerals 1806 and 1807, and 1808 and 1809 indicate two pairs of conveying rollers which are arranged in front and behind the printing position of a printing head and hold and convey a printing medium 1810, respectively. The printing medium 1810 such as paper is guided and supported by a platen (not illustrated) for regulating the printing surface of the printing medium flat at the printing position in a pressed state. The head cartridges (heads) 1801 and 1802 mounted on the carriage 1803 are located on the carriage 1803 so that the ejection openings come between the conveying rollers 1807 and 1809 to face the printing medium 1810 which is held under pressure on the guide surface of the platen (not illustrated).

In FIG. 18, six head cartridges in total are located and installed on the carriage 1803. In this example, the printing head 1801Y for yellow ink, 1801M for magenta ink, 1801C for cyan ink, 1801B for black ink, the ejection head 1802 for liquid composition, and the printing head 1801BB for a second black ink are arranged on the carriage 1803 in this order from the left to the right in the drawing. The ejecting head 1802 for liquid composition serves to eject a liquid composition reactive with the coloring material in each ink on the recording medium 1810. The rightmost printing head 1801BB for a second black ink is for ejecting a black ink used upon secondary scan printing in reciprocating printing. More specifically, the ejecting head 1802 is arranged next to (on the right side of) the printing head 1801B, and the printing head 1801BB is arranged next to the head 1802 (at the right end).

In FIG. 18, a recovery unit 1811 is arranged on the left side of a printing region. In the recovery unit 1811, caps 1812 for capping the printing heads 1801Y, 1801M, 1801C, 1801B are successively arranged from left to right corresponding to the arrangement of the head cartridges 1801, 1802, next to them (on the right side), a cap 1813 for capping the ejecting head 1802 for liquid composition is arranged, and a cap 1812 for capping the printing head 1801BB for second black ink is further arranged next to the cap 1812 on the right side thereof. These caps are vertically movably provided, and the ejection openings of the respective heads 1801, 1802 are tightly closed (capped) by bringing the caps 1812, 1813 corresponding to the ejection opening faces of the heads 1801, 1802 into contact under pressure with them when the carriage 1803 is located at the home position thereof, whereby the thickening and crusting of each ink in the ejection opening due to evaporation of the solvent in the ink are prevented to prevent the occurrence of ejection failure.

The recovery unit 1811 are equipped with a suction pump 1814 communicating with the caps 1812, and a suction pump 1815 communicating with the cap 1813. These pumps 1814, 1815 are used for carrying out a recovery operation by sucking by capping the ejection opening faces with the caps 1812, 1813 when ejection failure has occurred in the printing head 1801 or ejecting head 1802. A blade for the ejecting head 1802 for liquid composition is further arranged between the cap 1813 for the liquid composition, the fifth cap from the left, and the cap 1812 for the second black ink, the sixth cap from the left (located at the right end), and a blade 1816 for the respective printing heads 1801 is arranged on the right side (the side of the printing region) of the cap 1812 located at the right end. The blade 1817 is held by a blade holder 1819, and the blade 1816 is held by a blade holder 1818. In this aspect, the blade holders 1818, 1819 are caused to go up and down by a blade elevating mechanism (not illustrated) driven utilizing the movement of the carriage 1803, whereby the blade 1816, 1817 go up and down between a position projected for wiping the inks and foreign matter attached to the ejection opening faces of the heads 1801, 1802 and a receded position (stand-by position) coming into no contact with the ejection opening faces. In this case, the blade 1816 for wiping the printing heads 1801 and the blade 1817 for wiping the ejecting head 1802 for liquid composition are constructed in such a manner that they can be caused to separately go up and down independently of each other.

FIGS. 19A to 19F typically illustrate a wiping operation of the ink-jet printer shown in FIG. 18. In FIG. 18, the blade 1816 for printing heads is projected (lifted) as illustrated in FIG. 19A, and each head mounted on the carriage 1803 is moved from the right side (the side of the printing region) toward its home position. The blade 1816 for printing heads successively wipes the printing heads 1801 with the movement of the carriage toward the left as illustrated in FIG. 19B. As illustrated in FIG. 19C, the blade 1816 is receded (lowered) to the stand-by position at the time the ejecting head 1802 for liquid composition has come before the blade 1816 for printing heads (next to the blade 1816 on the right side) to prevent the contact of the blade 1816 with the ejecting head 1802 for liquid composition.

At the time the carriage 1803 has been further moved to the left to cause the ejecting head 1802 for liquid composition to pass through the blade 1816 for printing heads, both blade 1816 for printing heads and blade 1817 for ejecting head are projected (lifted) as illustrated in FIG. 19D, thereby conducting wiping of the ejecting head 1802 for liquid composition by the blade 1817 and wiping of the printing head 1801BB located on the right end by the blade 1816 at the same time with the movement of the carriage 1803 toward the left as illustrated in FIG. 19E. After wiping of all the heads 1801, 1802 is completed, both blades 1816, 1817 are receded (lowered) as illustrated in FIG. 19F to cause them to stand by at the stand-by positions thereof.

In the aspect illustrated in FIGS. 18 and 19A to 19F, wiping by the blades 1816, 1817 is conducted when the carriage 1803 is moved from the printing region side (right side) toward the home position side at which the recovery unit 1811 is located. However, the wiping direction is not limited to this direction, and wiping may be conducted when the carriage 1803 is moved from the home position side toward the right side (printing region side).

The ink-jet printer illustrated in FIG. 18 is so constructed that the liquid composition according to the present invention, which is reactive to a coloring material in an ink, is ejected on the printing medium 1810 from the ejecting head 1802 for liquid composition to bring it into contact with the ink ejected from each printing head 1801 on the printing medium 1810 to form a recorded article. The coloring material in the ink reacts with the liquid composition on the printing medium 1810 to be adsorbed in a monomolecular state on the surfaces of the fine particles in the liquid composition, and the fine particles form an image. Therefore, an image excellent in coloring and color uniformity is provided.

The present invention will hereinafter be described more specifically by the following examples and comparative examples. Incidentally, all designations of "part" or "parts" and "%" as will be used in the following examples mean part or parts by weight and % by weight unless expressly noted.

The zeta potential of each liquid composition was measured dispersing the liquid composition in ion-exchanged water to a solid concentration of fine particles of 0.1% and then measuring the zeta potential by means of a zeta potential meter (BI-ZETA plus, trade name, manufactured by Brookheaven Co., a liquid temperature: 20° C., an acrylic cell). The pH of each liquid composition was measured by using a pH meter (Castanee pH Meter D-14, trade name, manufactured by Horiba Ltd.). The average particle diameter of fine particles in each liquid composition was measured by means of a dynamic light scattering particle size distribution meter (BI-90, trade name, manufactured by Brookheaven Co.; liquid temperature: 20° C., using an acrylic cell) after dispersing the liquid composition in ion-exchanged water to a fine particle concentration of 0.1%.

First, preparation of liquid compositions used in the present invention is described.

Liquid Compositions A, B, and C were prepared as follows: components shown below were mixed and the resultant solution was then filtered under pressure through a membrane filter (Fluoropore Filter, trade name; product of Sumitomo Electric Industries, Ltd.) having a pore size of 1 μm.

<Liquid Composition A>

| | |
|---|---|
| Glycerol | 7.5% |
| Diethylene glycol | 7.5% |
| Alumina hydrate (average particle diameter: 0.17 μm) | 10.0% |
| Nitric acid | 0.2% |
| Water | 74.8%. |

The alumina hydrate used herein was prepared in accordance with the following synthetic process.

—Synthesis Example of Alumina Hydrate—

Aluminum dodeoxide was prepared in accordance with the process described in U.S. Pat. No. 4,242,271. It was hydrolyzed in accordance with the process described in U.S. Pat. No. 4,202,870 to prepare an alumina slurry. Water was added to this alumina slurry until the solid concentration of the alumina hydrate was 7.9%, at which the pH of the alumina slurry was 9.3. Then a 3.9% nitric acid solution was added to the slurry to adjust pH to obtain colloidal sol. The colloidal sol was spray-dried at 83° C. to prepare alumina hydrate. This alumina hydrate has positive surface charge in water and shows a cationic nature.

The pH of Liquid Composition A obtained above was 3.5, and its zeta potential was +39 mV. Even after Liquid Composition A was filled into an ink tank to conduct a shelf test for 1 month under conditions of 60° C./dry, no precipitate was observed in the ink tank, and ejection stability from a recording head was also good.

<Liquid Composition B>

| | |
|---|---|
| Glycerol | 7.5% |
| Diethylene glycol | 7.5% |
| Colloidal silica (average particle diameter: 0.02 μm; Snowtex AK, a trade name, product of Nissan Chemical Industries, Ltd.) | 10.0% |
| Nitric acid | 0.6% |
| Water | 74.4%. |

The colloidal silica used above was the one subjected to a cationizing treatment on the surface and showed a cationic nature in water.

The pH of Liquid Composition B obtained above was 3.8, and its zeta potential was +68 mV. Even after Liquid Composition B was filled into an ink tank to conduct a shelf test for 1 month under conditions of 60° C./dry, no precipitate was observed in the ink tank, and ejection stability from a recording head was also good.

<Liquid Composition C>

| | |
|---|---|
| Glycerol | 7.5% |
| Diethylene glycol | 7.5% |
| Colloidal zirconia (average particle diameter: 0.10 μm; trade name: $ZrO_2$ Sol, product of Daiichi Kigenso Kagaku Kogyo Co., Ltd.) | 10.0% |
| Nitric acid | 0.6% |
| Water | 74.4%. |

The colloidal zirconia used above was positively charged on the surface in water and exhibits a cationic nature.

The pH of Liquid Composition C obtained above was 3.1, and the zeta potential was +82 mV. Even after a shelf test where the composition C was filled in an ink tank and kept for 1 month under conditions of 60° C./dry, no precipitate was observed in the ink tank, and ejection stability from a recording head was also good.

<Liquid Composition E>

The following components were mixed in a water bath heated at 60° C., and the resultant mixture was subjected to ultrasonic stirring for 1 hour into a dispersion to provide Liquid Composition E.

| | |
|---|---|
| Nippe Microgel E-3101 (a trade name, anionic fine particles, product of Nippon Paint Co., Ltd.; styrene-acrylic acid copolymer, particle diameter: 0.3 μm, 19.7% aqueous dispersion) | 5 parts |
| Glycerol | 10 parts |
| Ethyl alcohol | 3.5 parts |
| Polyvinyl alcohol PVA117 (a trade name, product of Kuraray Co., Ltd.) | 0.5 parts |
| Water | 81 parts |

The preparation of Inks 1, 2, 3 and 4 used in Examples and Comparative Examples are described.

<Preparation of Ink 1 (Anionic Dye)>

The following components were thoroughly mixed and stirred, and the resultant solution was filtered under pressure through a Fluoropore Filter (trade name, product of Sumitomo Electric Industries, Ltd.) having a pore size of 0.45 μm, thereby Magenta Dye Ink M1 was obtained.

(Magenta Ink M1)

| | |
|---|---|
| Projet Fast Magenta 2 (Product of Zeneca Co.) | 3 parts |
| Glycerol | 7 parts |
| Urea | 7 parts |
| Acetylenol EH (trade name, product of Kawaken Fine Chemicals Co., Ltd.) | 0.2 parts |
| Isopropyl alcohol | 4 parts |
| Water | 78.8 parts |

<Preparation of Ink 2 (Anionic Self-Dispersing Pigment)>

—Preparation of Pigment Dispersion—

To 300 g of commercially-available acid carbon black "MA-77" (trade name, pH: 3.0, product of Mitsubishi Chemical Corp.) thoroughly mixed with 1,000 ml of water, 450 g of sodium hypochlorite (available chlorine concentration: 12%) were added dropwise and the mixture was stirred for 10 hours at 100 to 105° C. The resultant slurry was filtered through Toyo Filter Paper No. 2 (product of Advantes Co.) to fully wash the resultant pigment particles with water. The wet cake of this pigment was dispersed again in 3,000 ml of water, and the dispersion was desalted by means of a reverse osmosis membrane to a conductivity of 0.2 μs. The pigment dispersion (pH 8 to 10) was concentrated to a pigment concentration of 10% to obtain Pigment Dispersion 2 in which dispersed is a self-dispersing anionically charged carbon black having hydrophilic —$COO^-$ groups directly bonded to the surface.

—Preparation of Ink—

The following components were mixed and fully stirred. The resultant solution was then filtered under pressure through a microfilter (product of Fuji Photo Film Co., Ltd.)

having a pore size of 3.0 μm, thereby obtained was Black Pigment Ink Bk2. This ink was called Ink 2.

| Black Ink Bk2: | |
| --- | --- |
| Pigment Dispersion 2 | 30.0 parts |
| Trimethylolpropane | 6.0 parts |
| Glycerol | 6.0 parts |
| Ethylene glycol | 6.0 parts |
| Ion-exchanged water | 52.0 parts |

<Preparation of Ink 3(1) and 3(2)>

Ink 3(1) (Pigment):

Pigment Dispersion 3-1 was prepared as manner, and used to prepare Yellow Pigment Ink Y3(1).

| Preparation of Pigment Dispersion 3(1) | |
| --- | --- |
| Styrene-acrylic acid-ethyl acrylate terpolymer (acid value: 140; weight average molecular weight: 5,000) | 1.5 parts |
| Monoethanolamine | 1.0 part |
| Diethylene glycol | 5.0 parts |
| Ion-exchanged water | 81.5 parts |

The above components were mixed and heated to 70° C. in a water bath, thereby completely dissolving the resin. To this solution, 10 parts of Pigment Yellow newly prepared and 1 part of isopropyl alcohol were added and premixed for 30 minutes. Thereafter, the resultant premix was subjected to a dispersing treatment under the following conditions:

| | |
| --- | --- |
| Dispersing machine: | sand grinder (manufactured by Igarashi Kikai K.K.) |
| Grinding medium: | zirconium beads (diameter: 1 mm) |
| Packing rate of grinding medium: | 50% (by volume) |
| Grinding time: | 3 hours. |

The thus-obtained dispersion was subjected to a centrifugal treatment (12,000 rpm, 20 minutes) to remove coarse particles, thereby preparing Dispersion 3-1.

(Preparation of Ink)

The Dispersion 3-1 obtained above was used, and components having the following composition ratio were mixed to prepare a pigment-containing ink. This ink was Yellow Pigment Ink Y3 (Ink 3(1)).

| | |
| --- | --- |
| Pigment Dispersion 3-1 | 30.0 parts |
| Glycerol | 10.0 parts |
| Ethylene glycol | 5.0 parts |
| N-Methypyrrolidone | 5.0 parts |
| Ethyl alcohol | 2.0 parts |
| Ion-exchanged water | 48.0 parts |
| Ink 3(2) (water-insoluble dye + anionic dispersant): (Preparation of Water-insoluble Dye Dispersion 3-2) | |
| C.I. Disperse Red 150 wet cake | 24.0 parts |
| Styrene-acrylic acid-ethyl acrylate terpolymer (acid value: 250; weight average molecular weight: 13,000; solid content: 20%) | 20.0 parts |
| Isopropyl alcohol | 48.0 parts |
| Ion-exchanged water | 48.0 parts |

The above materials were fed into a batch type vertical sand mill (manufactured by Aimex Company, and glass beads of 1 mm diameter were filled as a grinding medium to conduct a dispersing treatment for 3 hours while cooling with water. After the dispersing treatment, Dispersion 3-2 having an average particle diameter of 120 nm and a solid content of 15% was obtained.

—Preparation of Ink—

Using the Dispersion 3-2 obtained above, components in the following ratio were mixed to prepare Water-insoluble Dye Ink 3(2).

| | |
| --- | --- |
| Pigment Dispersion 3-2 | 40.0 parts |
| Thiodiglycol | 16.0 parts |
| Diethylene glycol | 6.0 parts |
| Ion-exchanged water | 48.0 parts |

<Preparation of Ink 4 (Pigment+Nonionic Dispersant+Anionic Compound)>

Using Pigment Dispersion 4 prepared as follows, Cyan Pigment Ink C4 (Ink 4) used in the present invention was prepared.

| Preparation of Pigment Dispersion 4 | |
| --- | --- |
| Polyvinyl pyrrolidone | 2.0 parts |
| Polyoxyethylenepolyoxypropylene cetyl ether | 3.0 parts |
| Triethanolamine | 5.0 parts |
| Ion-exchanged water | 90.0 parts |

The above components were mixed and heated to 70° C. in a water bath to completely dissolve the resin. To this solution, 10 parts of Pigment Blue 15 newly prepared and 1 part of isopropyl alcohol were added and the components were mixed for 30 minutes. Thereafter, the resultant premix was subjected to a dispersing treatment under the following conditions:

| | |
| --- | --- |
| Dispersing machine: | sand grinder (manufactured by Igarashi Kikai K.K.) |
| Grinding medium: | zirconium beads (diameter: 1 mm) |
| Packing rate of grinding medium: | 50% (by volume) |
| Grinding time: | 3 hours. |

The thus-obtained dispersion was subjected to a centrifugal treatment (12,000 rpm, 20 minutes) to remove coarse particles, thereby preparing Dispersion 4.

—Preparation of Ink—

Using Dispersion 4 obtained above, components of following ratio were mixed to prepare a pigment-containing Cyan Ink 4 (Ink 4).

| | |
| --- | --- |
| Pigment Dispersion 4 | 30.0 parts |
| Glycerol | 10.0 parts |
| Urea | 5.0 parts |
| 2-Pyrrolidone | 5.0 parts |
| Ethyl alcohol | 2.0 parts |
| Polyacrylic acid | 1.5 parts |
| Ion-exchanged water | 46.5 parts |

EXAMPLES 1 to 9 and COMPARATIVE EXAMPLES 1 to 9

Liquid Compositions A to C and E and Inks 1 to 4 obtained in the above-described manner were used to make up ink sets, and recording was conducted on plain paper (trade name: Canon Office Multi, product of Canon Inc.) (hereinafter referred to as "KG paper") to obtain recorded images according to Examples 1 to 9 and Comparative Example 1 to 7.

Inks 1 to 4 by themselves were used to conduct recording on ink-jet coated paper (Color BJ Paper LC-10, and High-quality Special Paper HF-101, trade names, products of Canon Inc.) to form recorded images in Comparative Examples 8 and 9. Respective recording conditions are shown in Table 1.

An ink-jet recording apparatus similar to that shown in FIG. 4 was used to form color images using 5 recording heads as illustrated in FIG. 8. First, the liquid composition in each ink set was applied by ejection to the recording paper, and then respective inks were applied. Specifically, images were formed by 3-pass fine printing where a region is printed by conducting scanning 3 times. In each pass, the liquid composition was applied to the pixel positions to which any of the yellow, magenta, cyan and black inks was to be applied. Namely, the logical sum of printing data for yellow, magenta, cyan and black inks in each pass was used as the printing data for the liquid composition. Since there is no particular limitation to the kind of a fine mask in fine printing, and any publicly known technique may be used, the detailed description thereof is omitted.

The individual recording heads used had a record density of 600 dpi, and were driven under conditions of a drive frequency of 6 kHz. The ejection amount per dot was 15 ng for the yellow, magenta and cyan inks and the liquid composition, and 30 ng for the black ink.

Then, in the peripheral part and central part of each pixel constituting the recorded image, the ratio of the coloring material to the substance in the liquid composition was determined under the following conditions.

—Determination of Coloring Material Ratio in a Record Pixel—

A solid image was printed with a combination of a liquid composition and an ink as shown in Table 1, by using the above printer, and the pixels of the printed area were subjected to the elemental analysis by means of a scanning electron microscope SEM (S4700, trade name, manufactured by Hitachi Ltd.) and an X-ray microanalyser XMA (EDAX, trade name, manufactured by EDAX CO.) (hereinafter abbreviated as "XMA"). The measurement was conducted at several places in each sample, because of the variation. Incidentally, XMA can achieve elemental analysis in a several micron order, suitable for use in local elemental analysis of the surface. As the accelerating voltage must be changed with the element to be measured, it was set to a proper value according to each element. The evaluation standard is given below.

A: Ratio of an element derived from the coloring material in ink to an element derived from a substance in a liquid composition is larger at the peripheral part of a pixel than at the central part of the pixel;

B: Ratio of an element derived from the coloring material in ink to an element derived from the substance in a liquid composition is the same at the peripheral part of a pixel and at the central part of the pixel;

C: Ratio of an element derived from the coloring material in ink to an element derived from the substance in a liquid composition is rather small at the peripheral part of a pixel than at the central part of the pixel;

<Evaluation Method and Evaluation Standard of Printed Images>

The solid images of Examples 1 to 9 and Comparative Examples 1 to 9 were printed in the same conditions and evaluated in accordance with the following evaluation methods and evaluation standards. The results are shown in Table 2.

(1) Coloring Properties

Of the solid images of Examples 1 to 9 and Comparative Examples 1 to 9, optical density was measured, and these values were used for evaluation of coloring properties. Measurement was conducted 24 hr after printing by using GRETAG Spectrolino (trade name) under conditions of light source: D50 and visual field: 2°. The evaluation standards are given below. The ratio of the optical density (X) of images of each Example to that of corresponding Comparative Example (image printed with the corresponding ink alone on the same recording medium) was calculated and the average was evaluated by the following standard.

AA: $1.20 \leq X$;
A: $1.06 \leq X < 1.20$;
B: $1.0 \leq X < 1.06$;
C: $X < 1.0$.

With the colored images, their saturations were also determined.

The saturation is represented by $$\sqrt{(a^* \times a^* + b^* \times b^*)}$$

wherein a* and b* are values in CIE-L*a*b* space. As the saturation value, it is shown the lowest of the results obtained on plural sheets of KG paper in each of examples and comparative examples.

(2) Evenness:

Color evenness of an image printed by a printer was visually evaluated on haze and color irregularity. The evaluation standard was as follows:

A: Whitish haze and color irregularity scarcely occurred;
B: Whitish haze and color irregularity were slightly observed along paper fibers, but which causes no problem in actual use;
C: Whitish haze and color irregularity were markedly observed along paper fibers.

(3) Stripy Irregularity:

Solid images of Examples and Comparative Examples were printed by using the printer, and stripy irregularity was visually evaluated. The evaluation standard is as follows:

A: Stripy irregularity scarcely occurred;
B: Stripy irregularity every head scan was slightly observed, but which causes no problem in actual use;
C: White streak every head scan was markedly observed.

(4) Rub-Off Resistance:

A solid image was printed using the printer, and after 16 hours, silbon paper was placed on the printed area, and a weight 3.5 cm square was then placed on the silbon paper. The silbon paper was then pulled out at a rate of 15 cm/sec while applying a pressure of 40 g/cm$^2$, thereby evaluating the rub-off resistance of the printed area. The evaluation standard is as follows:

A: Rub-off of the ink scarcely occurred;
B: The ink slightly attached to the silbon paper, but rub-off of the ink at the printed area was not very conspicuous; and
C: The ink markedly attached to the silbon paper, and rub-off of the ink at the printed area was conspicuous.

(5) Texture:

After a solid image was printed using the printer, the texture of the recording medium was visually evaluated. The evaluation standard is as follows:
A: Printed area and unprinted area had the same texture of plain paper with conformity;
B: A printed area and an unprinted area were different from each other in texture, or the whole recording medium had different texture from plain paper.

<Preparation of Ink 5 (Anionic Dye)>

The following components were mixed and stirred into a solution, and the resultant solution was filtered under pressure through a Fluoropore Filter (trade name; product of Sumitomo Electric Industries, Ltd.) having a pore size of 0.45 μm, thereby obtaining Cyan Dye Ink C5 (Ink 5).

| | |
|---|---|
| C.I. Direct Blue 199 | 3 parts |
| Ethylene glycol | 7 parts |
| Diethylene glycol | 10 parts |
| Acetylenol EH (trade name, product of Kawaken Fine Chemicals Co., Ltd.) | 0.3 parts |
| Water | 79.7 parts |

EXAMPLE 10

The Ink 5 prepared above and Liquid Composition A were used to conduct printing. The printing conditions were the same as in Example 1.

—Observation of Amount of Coloring Material on Recording Medium—

Elemental analysis at an edge portion of the recorded image in this Example was conducted by using XMA. First, in an unprinted area of the recording medium, the relative amount of an element derived from a substance in the liquid composition (in this case, aluminum) and the relative amount of an element derived from the coloring material in the ink (in this case, copper) to an element present on the surface of the recording medium (in this case, calcium) were determined. Here, elements to be detected should be changed according to the recording medium, the substance in the liquid composition and the coloring material used. Then the elemental analysis was conducted at an edge portion of the colored image to determine the relative amounts of aluminum and copper to the calcium element in the same manner. The amounts of the respective elements were calculated based on the difference from those previously determined at the unprinted area, regarding them as the amounts of the substance in the liquid composition and the coloring material fixed to the recording medium at that portion. As a result, it was found that, in the edge portion, there are portions in which the amount of the coloring material is greater than that of the compound.

EXAMPLES 11 TO 17

Liquid Composition A and Ink 1 prepared above were used to conduct recording on 7 kinds of plain paper distributed worldwide under the trade names 1) to 7), thereby obtaining recorded images of Examples 11 to 17. These images were evaluated by the evaluation standards described above. The recording conditions and evaluation results are shown in Table 3.
1) PB PAPER (product of Canon Inc.),
2) Brilliant White Paper (product of Canon Inc.),
3) Great White Inkjet (product of Union Camp Co.)
4) Jet Print (product of Hammermill Co.),
5) Xerox 4024 (product of Xerox Co., Ltd.),
6) Bright White Inkjet Paper (product of Hewlett Packard Co.) and
7) Rey Jet (product of Aussdat Ray Co.)

As described above, according to the present invention, there are provided, especially when color ink-jet recording is carried out on plain paper, images of excellent coloring properties and color evenness comparable to those formed on ink-jet coat paper without losing the texture of plain paper, with less stripy irregularity in the solid image portion and of excellent rub-off resistance.

TABLE 1

| | Liquid composition | Ink | Recording medium | Coloring material distribution |
|---|---|---|---|---|
| Ex. 1 | A | 1 | KG paper | A |
| Ex. 2 | A | 2 | " | A |
| Ex. 3 | A | 3 (1) | " | A |
| Ex. 4 | A | 3 (2) | " | A |
| Ex. 5 | A | 4 | " | A |
| Ex. 6 | B | 1 | " | A |
| Ex. 7 | B | 3 (1) | " | A |
| Ex. 8 | C | 1 | " | A |
| Ex. 9 | C | 3 (1) | " | A |
| Comp. Ex. 1 | E | 1 | " | — |
| Comp. Ex. 2 | E | 3 (1) | " | — |
| Comp. Ex. 3 | Not used | 1 | " | — |
| Comp. Ex. 4 | Not used | 2 | " | — |
| Comp. Ex. 5 | Not used | 3 (1) | " | — |
| Comp. Ex. 6 | Not used | 3 (2) | " | — |
| Comp. Ex. 7 | Not used | 4 | " | — |
| Comp. Ex. 8 | Not used | 1 | LC-101 | B* |
| Comp. Ex. 9 | Not used | 1 | HR-101 | B* |

*In Comparative Examples 8 and 9, the recording paper itself has a coating layer containing porous fine particles detectable by XMA.

TABLE 2

| | Coloring property | Evenness | Stripy irregularity | Rub-off resistance | Texture | Saturation |
|---|---|---|---|---|---|---|
| Ex. 1 | AA | A | A | A | A | 71 |
| Ex. 2 | AA | A | A | A | A | — |
| Ex. 3 | AA | A | A | A | A | 80 |
| Ex. 4 | B | A | A | A | A | —⁺ |
| Ex. 5 | AA | A | A | A | A | 50 |
| Ex. 6 | A | A | A | A | A | 68 |
| Ex. 7 | A | A | A | A | A | 75 |
| Ex. 8 | A | A | A | A | A | 67 |
| Ex. 9 | A | A | A | A | A | 75 |
| Comp. Ex. 1 | B | B | B | B | A | —⁺ |
| Comp. Ex. 2 | A | B | B | B | A | —⁺ |

TABLE 2-continued

| | Coloring property | Evenness | Stripy irregularity | Rub-off resistance | Texture | Saturation |
|---|---|---|---|---|---|---|
| Comp. Ex. 3 | — | C | B | A | A | 62 |
| Comp. Ex. 4 | — | B | A | B | A | — |
| Comp. Ex. 5 | — | C | A | C | A | 70 |
| Comp. Ex. 6 | — | C | A | C | A | —⁺ |
| Comp. Ex. 7 | — | C | A | C | A | 40 |
| Comp. Ex. 8 | A* | A | A | A | B | 65 |
| Comp. Ex. 9 | AA* | A | A | A | B | 70 |

*evaluated in comparison with Comparative Example 3
⁺not determined

TABLE 3

| | Recording medium | Coloring property | Evenness | Stripy irregularity | Rub-off resistance | Texture |
|---|---|---|---|---|---|---|
| Ex. 1 | 1 | AA | A | A | A | A |
| Ex. 2 | 2 | AA | A | A | A | A |
| Ex. 3 | 3 | AA | A | A | A | A |
| Ex. 4 | 4 | AA | A | A | A | A |
| Ex. 5 | 5 | AA | A | A | A | A |
| Ex. 6 | 6 | AA | A | A | A | A |
| Ex. 7 | 7 | AA | A | A | A | A |

What is claimed is:

1. An ink-jet imaged recording medium comprising a colored portion, wherein the colored portion comprises aggregates of fine particles, each of the fine particles having a coloring material thereon by adsorption in a monomolecular state,
wherein the recording medium is a plain paper,
wherein the coloring material is anionic or cationic, and the fine particles have a polarity opposite to that of the coloring material,
wherein the colored portion is obtained by applying an ink containing the coloring material and a liquid composition containing the fine particles to the recording medium in such a manner that the ink and the liquid composition come in contact with each other in a liquid state, and
wherein a ratio of the coloring material to the fine particles is larger in a peripheral portion of the image than in the remaining portion of the image.

2. The ink-jet imaged recording medium according to claim 1, wherein a saturation in CIE-L*a*b* space at a solid printed area of the colored portion is at least 50.

3. The ink-jet imaged recording medium according to claim 1, wherein the fine particles have such a surface potential that an absolute value of a zeta potential in an aqueous liquid composition in which the fine particles are dispersed is 5 to 90 mV.

4. The ink-jet imaged recording medium according to claim 1, wherein the average particle diameter of the fine particles is within a range of from 0.005 to 1 μm.

5. The ink-jet imaged recording medium according to claim 1, wherein the image is of plural colors.

6. The ink-jet imaged recording medium according to claim 5, wherein the plural colors are at least two colors selected from the group consisting of yellow, magenta, cyan, red, green, blue and black.

7. The ink-jet imaged recording medium according to claim 1, wherein the coloring material is anionic, and the fine particles are cationic.

* * * * *

UNITED STATES PATENT AND TRADEMARK OFFICE
CERTIFICATE OF CORRECTION

PATENT NO. : 7,198,837 B1
APPLICATION NO. : 09/708569
DATED : April 3, 2007
INVENTOR(S) : Endo et al.

It is certified that error appears in the above-identified patent and that said Letters Patent is hereby corrected as shown below:

On The Title Page

At Item (75), Inventors, "Yutaka Kurabayashi, Murayama (JP)" should read --Yutaka Kurabayashi, Higashi Murayama (JP)--.

COLUMN 1

Line 20, "actin" should read --action--.
Line 36, "+for" should read --for--.

COLUMN 6

Line 16, "process" should read --process where--.

COLUMN 7

Line 18, "process" should read --process where--.

COLUMN 11

Line 56, "portion is" should read --portion IS--.

COLUMN 23

Line 67, "suitable" should read --suitably--.

COLUMN 25

Line 52, "[$CH_2$=C(CH3)-CONH$C_2$$H_4$N($CH_3$)2]" should read --[$CH_2$=C(CH3)-CONH$C_2$$H_4$N($CH_3$)$_2$]--.

UNITED STATES PATENT AND TRADEMARK OFFICE
CERTIFICATE OF CORRECTION

| | | |
|---|---|---|
| PATENT NO. | : 7,198,837 B1 | |
| APPLICATION NO. | : 09/708569 | |
| DATED | : April 3, 2007 | |
| INVENTOR(S) | : Endo et al. | |

It is certified that error appears in the above-identified patent and that said Letters Patent is hereby corrected as shown below:

COLUMN 26

Line 62, "$NO_3$— or $CH_3COO$— as" should read --$NO_3^-$ or $CH_3COO^-$ as--.

Signed and Sealed this

Twenty Second Day of April, 2008

JON W. DUDAS
*Director of the United States Patent and Trademark Office*